(12) United States Patent
Kauffman et al.

(10) Patent No.: US 10,944,819 B2
(45) Date of Patent: Mar. 9, 2021

(54) REPLICATION OF AN ENCRYPTED VOLUME

(71) Applicant: HEWLETT PACKARD ENTERPRISE DEVELOPMENT LP, Houston, TX (US)

(72) Inventors: Kevin Kauffman, Durham, NC (US); Nguyen Truong, Durham, NC (US); Cristian Medina Abkarian, Durham, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1 day.

(21) Appl. No.: 16/171,793

(22) Filed: Oct. 26, 2018

(65) Prior Publication Data

US 2020/0137156 A1    Apr. 30, 2020

(51) Int. Cl.
*H04L 29/06* (2006.01)
*H04L 29/08* (2006.01)
(Continued)

(52) U.S. Cl.
CPC .......... *H04L 67/1095* (2013.01); *G06F 3/065* (2013.01); *G06F 3/067* (2013.01);
(Continued)

(58) Field of Classification Search
CPC ........ G06F 3/0623; G06F 3/065; G06F 3/067; H04L 67/1095
(Continued)

(56) References Cited

U.S. PATENT DOCUMENTS 7,028,153 B1    4/2006  Noble et al.
8,135,861 B1    3/2012  Bachu et al.
(Continued)

FOREIGN PATENT DOCUMENTS

EP      2878102 A1    6/2015
JP    2003-264541 A   9/2003
(Continued)

OTHER PUBLICATIONS

"VMWare vSphere Replication Administration vSphere Replication 6.0"—VMWare, Princeton University, Aug. 2017 https://docs.mware.com/en/vSphere-Replication/6.0/vsphere-replication-60-admin.pdf (Year: 2017).*
(Continued)

*Primary Examiner* — Randy A Scott
(74) *Attorney, Agent, or Firm* — Trop, Pruner & Hu, P.C.

(57) ABSTRACT

A technique includes setting up a replication partnership between a first storage node and a second storage node. The replication partnership includes establishment of a secure connection between the first storage node and the second storage node using a remote internet protocol address, a base port, and an identifying key pair. A port forwarding configuration may then be created, in part, by adding a pre-established port offset relative to a base port (e.g., a well-known TCP/IP port) for a first of a set of one or more pre-established port offsets. This process may be repeated for each remaining instance of the one or more pre-established port offsets. Encryption keys may be exchanged between the first storage node and the second storage node using at least one of the base port or the pre-established port offsets. Replication between the first storage node and the second storage node may be performed securely using the established communication channels.

20 Claims, 14 Drawing Sheets

(51) Int. Cl.
*G06F 3/06* (2006.01)
*G06F 15/16* (2006.01)
*G06F 15/173* (2006.01)

(52) U.S. Cl.
CPC ........ *G06F 3/0623* (2013.01); *H04L 63/0281* (2013.01); *H04L 63/061* (2013.01)

(58) Field of Classification Search
USPC ........ 709/217, 219, 231, 241, 249; 711/114, 711/162, 164, 167
See application file for complete search history.

(56) References Cited

U.S. PATENT DOCUMENTS

| | | | |
|---|---|---|---|
| 9,009,525 | B1 | 4/2015 | Murphy et al. |
| 9,152,578 | B1* | 10/2015 | Saad ................... G06F 12/1408 |
| 9,378,262 | B2 | 6/2016 | Braddy |
| 9,516,016 | B2 | 12/2016 | Colgrove et al. |
| 9,594,636 | B2* | 3/2017 | Mortensen ............... G06F 11/14 |
| 9,602,344 | B1 | 3/2017 | Iyengar et al. |
| 9,661,007 | B2 | 5/2017 | Gasparakis et al. |
| 9,740,880 | B1 | 8/2017 | Natanzon et al. |
| 10,019,194 | B1* | 7/2018 | Baruch ................... G06F 3/065 |
| 2003/0043740 | A1 | 3/2003 | March et al. |
| 2003/0088768 | A1 | 5/2003 | Challener |
| 2003/0154306 | A1 | 8/2003 | Perry |
| 2003/0210691 | A1* | 11/2003 | Chen ................. H04L 29/12377 370/389 |
| 2005/0081119 | A1 | 4/2005 | Dizoglio et al. |
| 2005/0144474 | A1 | 6/2005 | Takala et al. |
| 2007/0153782 | A1 | 7/2007 | Fletcher et al. |
| 2009/0100109 | A1 | 4/2009 | Turski et al. |
| 2009/0177856 | A1 | 7/2009 | Herne |
| 2009/0210461 | A1 | 8/2009 | McChord |
| 2011/0055899 | A1 | 3/2011 | Dollar |
| 2012/0123920 | A1 | 5/2012 | Fraser et al. |
| 2013/0219469 | A1 | 8/2013 | Peterson et al. |
| 2015/0020186 | A1 | 1/2015 | Deutsch et al. |
| 2015/0046600 | A1 | 2/2015 | Kim |
| 2015/0295890 | A1* | 10/2015 | Qin ......................... H04L 63/02 726/11 |
| 2015/0347548 | A1* | 12/2015 | Mortensen ............... G06F 11/00 707/618 |
| 2016/0266801 | A1 | 9/2016 | Marcelin et al. |
| 2017/0060695 | A1 | 3/2017 | Clare et al. |
| 2017/0316075 | A1 | 11/2017 | Deshmukh et al. |
| 2018/0077121 | A1* | 3/2018 | Gordon ............... H04L 63/0281 |

FOREIGN PATENT DOCUMENTS

| | | |
|---|---|---|
| JP | 2003264541 A | 9/2003 |
| WO | 20131020178 A1 | 2/2013 |
| WO | 20141166571 A1 | 10/2014 |
| WO | 20171190129 A1 | 11/2017 |

OTHER PUBLICATIONS

Huawei Technologies Co., Ltd., "Oceanstor 2800 V3 Storage System V300r003: Security Configuration Guide," Issue No. 4, Mar. 27, 2017, 61 pages.

Wikipedia, "HTTPS", available online at <https://en.wikipedia.org/w/index.php?title=HTTPS&oldid=833172891>, Mar. 30, 2018, 10 pages.

Wikipedia, "Secure Shell," available online at <https://en.wikipedia.org/w/index.php?title=Secure_Shell&oldid=833485297>, Mar. 31, 2018, 12 pages.

Allcock, B. et al., "Secure, Efficient Data Transport and Replica Management for High-performance Data-intensive Computing," Dec. 11, 2005, 15 pages, https://ieeexplore.ieee.org/abstract/document/4022180/.

Fleishman, G., "The Best Online Backup Service for Securely Encrypting Your Data," Sep. 26, 2016, 11 pages, http://www.infoworld.com/article/3124144/cloud-computing/the-best-online-backup-service-for-securely-encrypting-your-data.html.

Masha, T. et al., "Replication Security Best Practices," Mar. 14, 2017, 21 pages, https://docs.microsoft.com/en-us/sql/relational-databases/replication/security/replication-security-best-practices?view-sql.server.2017.

Masha, T. et al., "Securing Replication over the Internet," Mar. 14, 2017, 7 pages, https://docs.microsoft.com/en-us/sql/relational-databases/replication/security/securing-replication-over-the-internet?view-sql.server.2017.

Wikipedia, "Transport Layer Security," Jun. 28, 2018, <https://en.wikipedia.org/w/index.php?title=Transport_Layer_Security&oldid=847869767.

* cited by examiner

REPLICATION OF AN ENCRYPTED VOLUME

BACKGROUND

A computer network may have a backup and recovery system for purposes of restoring data on the network to a prior, consistent state should the data become corrupted, be overwritten, subject to a viral attack, etc. The backup data may be stored at a different geographic location than the source data. For example, backup data for a given group of storage nodes of a computer network may be stored in a geographically remote, cloud-based group, or pod, of storage nodes. Storing backups in geographically diverse locations may involve establishing a trust relationship between the source of the data and each location where a copy of the data is stored for backup purposes.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
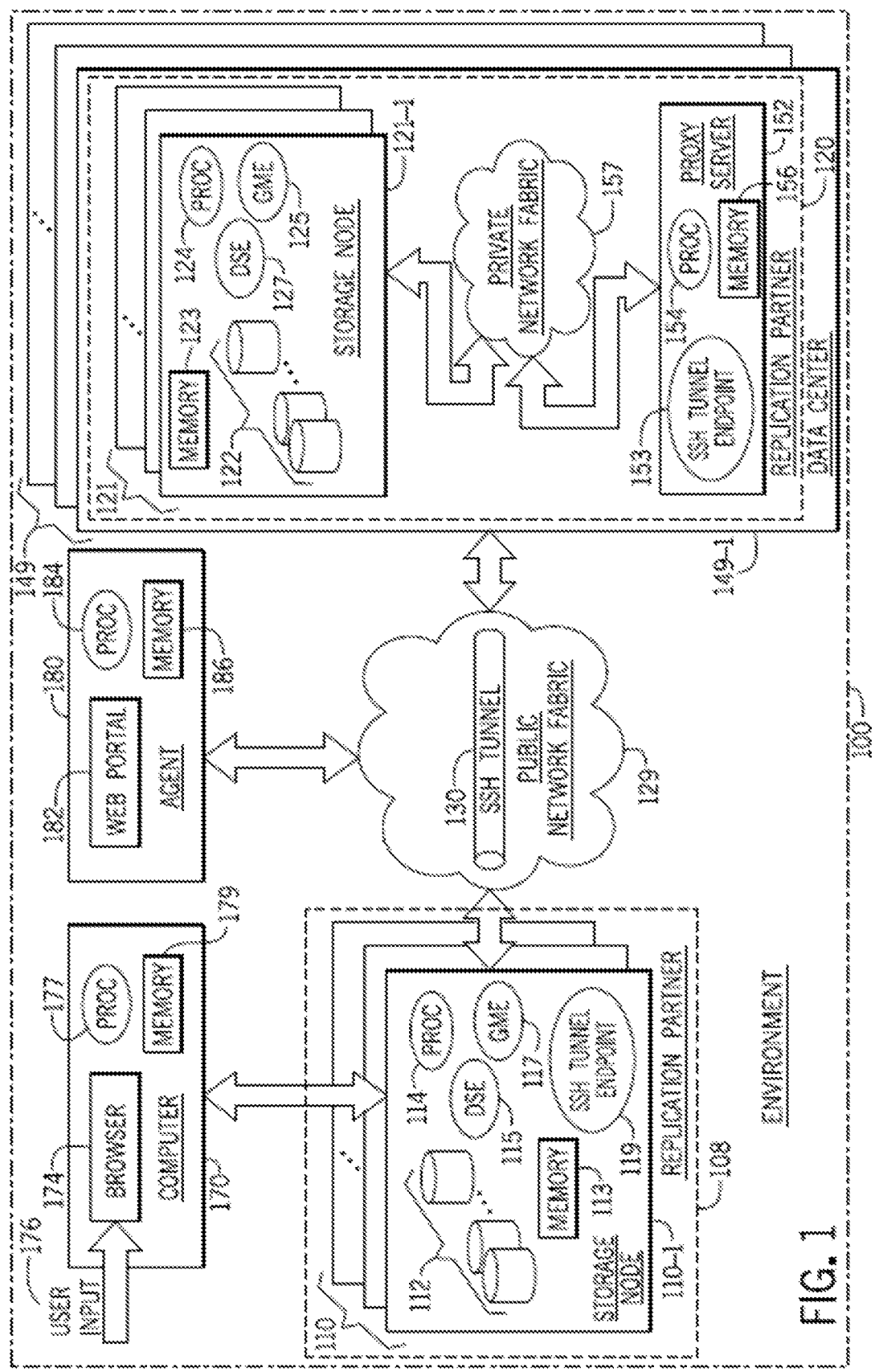
FIG. 1 is a schematic diagram of an environment associated with a replication partnership according to an example implementation.

Examples of the subject matter claimed below will now be disclosed and then a specific non-limiting implementation will be explained with reference to the FIGs. In the interest of clarity, not all features of an actual implementation are described in every example of this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The above-mentioned trust relationship may allow the computers with the source data ensure they are sending backup data to remote computers that are trusted to securely store the data. Allowing data to be moved between geographically dispersed locations often includes the data traveling over at least a portion of the public Internet. While on the Internet portion of the network, data may be subject to interception by unknown parties. Further, data moving across these public networks may contain confidential information. To avoid allowing data that may contain confidential information to be intercepted, the data transmission is sometimes performed over an encrypted communication channel. This encrypted communication channel may be established and enabled at the time the trust relationship is created between the source of the data and each location where a copy of the data is stored for backup.

In addition to the above transmission encryption, there may be more levels of encryption applied to the data stored at the source. Business applications commonly desire that data stored on a computer is encrypted as it is written to a storage medium. It follows that replicated copies of the data must also be stored as encrypted data. Replicated copies of the data may be an exact copy of the source data, and therefore, in this situation, must be stored in an identical encrypted form using the same encryption. Disclosed techniques provide flexibility and improvements to security, reliability, performance, and overall system administration tasks associated with maintaining replicated encrypted volumes.

A group of one or multiple storage nodes of a computer network may be configured to be a replication partner with a geographically remote group of one of multiple storage nodes. Due to this partnership, replication data may be communicated between the replication partners so that, in general, each replication partner stores the same data. As an example, a group of storage nodes of a computer network may have a replication partnership with a group, or pod, of cloud-based storage nodes. In this manner, the group of storage nodes of the computer network may be a local replication partner, and as data changes on the local replication partner, the local replication partner may communicate replication data to the cloud-based storage nodes, which is the remote replication partner. In general, the replication data represents changes in the data stored on the local replication partner, so that the data stored on the remote replication partner may be used to restore the data on the local replication partner to a prior, consistent state.

In this context, a "storage node" refers to an independent unit of storage, which contains one or multiple storage devices (flash memory drive devices, magnetic media drive devices, and so forth) and is capable of communicating data with another storage node. As a more specific example, a given storage node may be an independent computer system containing one or multiple storage devices, a storage area network (SAN), and so forth. Moreover, a given storage node may employ block-based or file-based storage.

Because the replication partners may be disposed at different geographical locations, the replication data may be communicated between the replication partners over a secure communication channel of a public network. In this context, a "secure communication channel" refers to a logical connection that employs some degree of security features for purposes of preventing unauthorized access to or the reading of the data communicated between the replication partners. As an example, the secure communication channel may involve the encryption of plaintext data to form ciphertext data that is communicated to the communication channel and the decryption of ciphertext data that is received from the communication channel. The secure communication channel may be established, for example, by a secure channel communication protocol, such as a Secure SHell (SSH) protocol, which establishes a secure communication channel called an "SSH tunnel," or "SSH connection" herein. Thus, when two arrays are geographically apart, replication may happen over a public network, and the replication has security for data exchange for purposes of preventing malicious attempts at reading the data. Because setting up replication over a public network may involve opening up network ports in the infrastructure or creating a communication hole in the private network, securing the network infrastructure at two endpoints of replication may be beneficial.

One way to securely communicate replication data over a public network is to delegate the security of the replication data transfer and the security of the network infrastructure to specific network devices, such as firewall or virtual private network (VPN) devices. These network devices may not, however, be part of either storage array system. If potential replication partners are not owned by the same entity and will involve communicating the replication data over a public network, it may be challenging to set up such network devices with the appropriate keys, credentials, and so forth.

In accordance with example implementations that are described herein, a web portal and a proxy server (e.g., an "SSH proxy" in accordance with example implementations) are used to setup and manage a replication partnership between a first replication partner (called a "local replication partner" herein) and a geographically remote second replication partner (called a "remote replication partner" herein) over a public network. As an example, the local replication partner may contain one or multiple storage nodes, such as storage node(s) of a computer network; and a backup and recovery solution for the computer network may include forming a replication partnership between these storage node(s) of the computer network and a group, or pod, of one or multiple cloud-based storage node(s) (i.e., the remote replication partner).

In general, a user associated with a computer network may access the web portal through a browser (an application that allows accessing information from the Internet) that executes on the user's computer. The web portal may be provided by an agent (a cloud-based server, for example), for the local replication partner. In general, the agent orchestrates setting up the replication partnership and the agent/web portal may be owned by a different entity than the entity that owns the computer network. The user may provide input (via keystrokes, mouse clicks, touch screen gestures, and so forth) to the web portal for purposes of requesting a new replication partnership. In this manner, the input provided to the web portal may describe the overall setup for the replication partnership. In this manner, the "overall setup" for the replication partnership includes generally setting up criteria for the replication partnership, including: setting up an identifier used in the future to identify the replication partnership; identifying the one or more storage nodes to form the "local partner" of the replication partnership; establishing the identifier(s) of the local storage nodes of the local replication partner; and the identifying key pair used by the local replication partner, and any additional implementation dependent criteria.

Moreover, the user may provide input to the web portal to identify (storage tier, storage size, geographical area, and so forth) for selecting the storage node(s) that will form the remote replication partner. Also, in accordance with example implementations, the user may provide input to the web portal to identify one or multiple storage nodes of the computer network that are to form the local replication partner. The browser (via execution of a script, for example) may then retrieve information, such as SSH keys (i.e. an identifying key pair) and storage node identifications (IDs), for example, from the storage node(s) of the local replication partner. This information may then be sent to the web portal. The web portal may use the information to configure the replication partnership, as further described herein.

In general, an "SSH key" refers to an identifying key pair that is used to identify a network entity to an SSH server using public key cryptography and challenge-response authentication, pursuant to the SSH protocol.

In accordance with example implementations, based on the criteria provided by the user, the agent selects the storage node(s) that form the remote replication partner. In accordance with example implementations, selection involves selecting a particular data center associated with the user's selected geographical area and selecting a group of one or multiple storage nodes of the selected datacenter.

In accordance with example implementations, the remote replication partner is associated with a proxy server (a proxy server of the selected data center, for example). The proxy server may serve as a network endpoint for replication partnerships involving storage nodes of the data center. It is noted that the datacenter may include multiple such proxy servers.

In general, the agent communicates with the proxy server to configure the remote replication partner for the replication partnership and configure the proxy server for the secure communication channel to be used to communicate the replication data for the replication partnership. In accordance with example implementations, the agent communicates with the proxy server to store credentials of the local replication partner in the proxy server so that when the local replication partner initiates the secure communication channel with the proxy server, the proxy server can authenticate the local replication partner. Moreover, the agent communicates with the proxy server to set up port translations (or "mappings") that may be used in connection with the secure communication channel. In this context, the port translations refer to port forwarding performed by both network endpoints of the secure communication channel, as further described herein.

In accordance with example implementations, after the agent communicates with the proxy server (of the remote replication partner) to set up the replication partnership and set up the associated secure communication channel, the agent may then communicate data to the local replication partner pertaining to details about the replication partnership and secure communication channel. In this manner, the agent may communicate replication partnership login identification for the local replication partner, port forwarding details, and so forth. The local replication partner may thereafter initiate communication with the proxy server (e.g., an SSH proxy, in accordance with example implementations) for purposes of creating the secure communication channel (e.g., an SSH connection, or SSH tunnel). After the secure communication channel is created, the local replication partner may communicate with remote replication partner for purposes of transferring replication data over the secure communication channel.

Established replication partnerships may be designed such that the replication of data that is to be stored maintains an encrypted form. That is to say that after the secure replication channel has been established, data transmitted securely in accordance with example implementations may also be stored securely using an encryption mechanism. To enable data to be stored securely with encryption, a variety of techniques of negotiating port forwarding may be used. One such possible technique may be to establish a set of well-known pre-established port offsets that are used to establish port forwarding rules upon the initiation of the secure communication channel between replication partners. The concept of "pre-established port offsets" in this context means that all replication partners have a list of the port offsets relative to a "well-known port" and are configured to appropriately use each offset for data replication activities. The Internet Assigned Numbers Authority (IRNA) is responsible for maintaining the official assignments of port numbers for specific uses and maintains an official listing of all well-known ports. Further, in the context of this disclosure, a well-known port refers to a port that is known ahead of time (e.g., pre-established) at each server participating in the disclosed communication techniques. The variation of port negotiation as disclosed herein may be employed by replication partners to exchange encryption keys that may be required when encrypting replicated data for storage.

Another such variation of the port forwarding techniques that may be employed to store replicated data securely encrypted is to negotiate the port forwarding rules needed to facilitate replication after encryption keys are exchanged between replication partners. Replication partners that may have utilized the previously described mechanism using pre-established port offsets may use the port forwarding configuration resulting from the pre-established offsets to orchestrate the exchange of keys before negotiating additional port forwarding configurations required to support data replication.

Due to the techniques and systems that are described herein, information may be readily, easily, and securely exchanged between storage nodes for purposes of setting up a replication partnership between the nodes, even when the storage nodes are owned by different entities. Moreover, the storage nodes do not need associated special devices, such as virtual private network (VPN) devices, firewalls, and so forth.

Having an understanding of the above overview, this disclosure will now explain a non-limiting but detailed example implementation. This example implementation is explained with reference to the figures and includes: different example devices that may be used to establish replication partnerships and execute replication activities (FIGS. 1-2); examples of methods that may be needed to successfully execute replication activities (FIGS. 2-4); an example processor and computer-readable medium to implement the example replication method (FIGS. 5-6); an example of systems orchestrating replication activities (FIGS. 7A-B); an example method for systems to orchestrate replication activities (FIG. 8); an example processor and computer-readable medium to implement the example replication orchestration method (FIG. 9); an example system of a network of computers where network communication devices supporting replication may be implemented (FIG. 10); and an example processing device that may be used in one or more devices that may implement the disclosed replication techniques or on devices set up to support those techniques (FIG. 11).

FIG. 1 depicts an example environment 100 for setting up a replication partnership according to an example implementation. The replication partnership to be set up for this example includes a first replication partner 108 (also called the "local replication partner" herein) and a second replication partner 120 (also called the "remote replication partner" herein). The local replication partner 108 includes one or multiple storage nodes 110, and the remote replication partner 120 includes one or multiple storage nodes 121. As an example, a storage node 110 or 121 may be a storage array (a storage area network (SAN), for example).

As a more specific example, the storage node(s) 110 may be at a different geographical location than the storage node(s) 121. In accordance with some implementations, the storage node(s) 121 may be part of a data center 149, and the data center 149 may be one of multiple data centers 149 that provide cloud-based data storage and are located at different geographical locations. For example, in this manner, for the United States, one or multiple data centers 149 may be associated with an East coast location, one or multiple data centers 149 may be associated with a West coast location, and so forth.

It is noted that FIG. 1 depicts an example group, or pod, of storage nodes 121 of the particular data center 149-1. The data center 149-1 may contain additional storage nodes, which may be associated with different storage pods and/or different replication partnerships. The storage nodes 121 that are depicted in FIG. 1 may be associated with more than one replication partnership. Moreover, a computer network containing the storage nodes 110 for the local replication partner 110 have additional storage nodes that are not associated with the replication partnership described herein, and the storage nodes 110 depicted in FIG. 1 may be associated with other replication partnerships.

As also depicted in FIG. 1, for the replication partnership described herein, a secure communication channel, such as an SSH tunnel 130, is to be used to communicate the replication data between the replication partners 108 and 120. In general, replication data may be communicated between the replication partners 108 and 120 in either direction across the SSH tunnel 130.

In general, the storage nodes 110 may, in accordance with example implementations, be associated with a private network (not illustrated). In this manner, in general, the storage nodes 110 may not have addresses that are accessible via public Internet Protocol (IP) addresses.

As a more specific example, in accordance with some implementations, the computer 170 may execute machine executable instructions to provide an Internet browser 174. Using the browser 174, the user may, via public network fabric 129, access a web portal 182, which is an Internet-based interface that is provided by an agent 180 (an Internet server, for example). The connection to the web portal 182 may be through a Hypertext Transport Protocol Secure (HTTPS) session, for example. After providing the appropriate login credentials, the user may access a page of the web portal 182 for purposes of creating, or setting up, the remote replication partner. Using the access to the web portal 182, the user may enter a name for the remote replication partner to be created, data (through dialog boxes, for example) to select a particular geographic region (e.g., East Coast, Midwest, Southwest, West Coast and so forth) for the remote replication partner and other criteria to be considered for purposes of selecting the remote replication partner, such as the storage tier, and the amount, or capacity, of data storage. Based on these parameters, the agent 180 may select a particular data center 149 (data center 149-1 for the example depicted in FIG. 1) and a group of one or multiple storage nodes 121 of the selected data center 149.

In accordance with example implementations, a user (a network administrator, for example) who is affiliated with the computer network containing the storage nodes 110 may initiate the creation of a replication partnership with the nodes 110. In this manner, in accordance with example implementations, the user may provide user input 176 (input derived from keystrokes, mouse interaction with a graphical user interface (GUI), touch gestures and so forth) with a computer 170 for purposes of setting up the replication partnership, identifying the storage nodes 110 that form the local replication partner 108 and identifying criteria for the remote replication partner 120, such as the name of the remote replication partner 120. The setting up of the replication partnership may, for example, involve the user using the computer 170 to access the storage nodes 110 for purposes of retrieving data from the storage nodes 110 pertaining to credentials and identifications of the storage nodes 110. The setting up of the replication partnership may also, for example, involve the user configuring aspects of the replication that may include specifying that data on storage nodes must be stored encrypted on the remote nodes.

In this manner, the user may, through a dialog box, enter a name of the remote replication partner. The browser 174 may then execute a script to cause the browser 174 to, through an HTTPS session with the storage node(s) 110, retrieve credentials (SSH keys (i.e. an identifying key pair), for example) from the storage nodes 110. In accordance with some implementations, access of the computer 170 to the storage nodes 110 may be through the use of private network fabric (not illustrated). The browser 174 then may communicate with agent 180 via HTTPS session, providing details and credentials of storage node(s) 110 and request to create a replication partnership between local storage node(s) 110 and storage node(s) 121 that are selected to form the remote replication partner 120.

The agent 180 may then communicate with a proxy server 152 for the data center 149-1 via the public network fabric 129. In this manner, as further described herein, the agent 180 may communicate with the proxy server 152 for purposes of transferring credentials for the storage nodes 110 to the proxy server 152 and configuring port forwarding that is used with the SSH tunnel 130. The proxy server 152, in accordance with example implementations, may communicate with the agent 180 to provide configuration data to the agent 180, such as replication partnership details, including, SSH tunnel credentials, (and the public IP address and port for the proxy server 152, and so forth. The agent 180, may then communicate replication partnership details and SSH tunnel credentials to the browser 174, which may then communicate this information to the local replication partner 108 and cause the local replication partner 108 to initiate the SSH connection with the proxy server 152.

In accordance with some implementations, one of the storage nodes 110 of the local replication partner 108, such as storage node 110-1, is a manager for the group of storage nodes 110 (i.e., initiates and drives the replication for the group of storage nodes 110-1) and serves as an SSH tunnel endpoint 119 for the local replication partner 108. On the other end of the SSH tunnel 130, the proxy server 152 serves as an SSH tunnel endpoint 153 for the remote replication partner 120; and one of the storage nodes 121, such as storage node 121-1, is the manager for the group of storage nodes 121 of the remote replication partner 120.

As depicted in FIG. 1, the proxy server 152 may communicate with the storage nodes 121 via private network fabric 157. In accordance with example implementations, due to local and remote port forwarding associated with communications over the SSH tunnel 130 (as described herein), the storage nodes 110 may open a single SSH port for the SSH tunnel 130, and likewise, the proxy server 152 may open a single SSH port.

As noted above, in accordance with example implementations, the browser 174 may perform the functions described herein through the execution of a program, or script. In this regard, the browser 174 as well as the program executed by the browser 174 may be formed through machine executable instructions (i.e., "software") that are stored in a memory 179 of the computer 170 and are executed by one or multiple hardware processors 177. In general, the memory 179 may be formed from a non-transitory storage medium, such as a storage medium formed from one or multiple semiconductor storage devices, magnetic storage devices, memristors, phase change memory devices, flash memory devices, volatile memory devices, non-volatile memory devices, a combination of storage devices formed from one or more of the foregoing or other storage devices, and so forth. The processor(s) 177 may be, as examples, one or multiple Central Processing Units (CPUs), one or multiple CPU processing cores, and so forth.

The agent 180 may contain one or multiple hardware processors 184 and a memory 186 that stores instructions that, when executed by one or more of the processors 184, cause the processor(s) 184 to perform one or more functions of the agent 180, which are described herein. In a similar manner, the proxy server 152 may contain one or multiple hardware processors 154 and a memory 156 that stores instructions that, when executed by the processor(s) 154, cause the processor(s) 154 to perform one or more of the functions of the proxy server 152 which are described herein. It is noted that the memories 156 and 186 may be non-transitory memories and may contain one or more storage devices, similar to the memory 179. Moreover, the processors 154 and 184 may be processors similar to the processors 177.

In accordance with example implementations, the storage node 110 may include one or multiple storage devices 112 (e.g., magnetic storage drives, flash memory drives, and so forth). Moreover, the storage node 110 may contain one or multiple processors 114 and a non-transitory memory 113 that stores instructions that, when executed by the processor 115, cause the processor 115 to perform one or more functions of the storage node 110 described herein. In particular, in accordance with some implementations, the execution of instructions by the processor(s) 114 may cause the processor(s) 115 to form background processes, or daemons, such as a group management engine 117.

The group management engine 117, in accordance with example implementations, controls the actions of the manager node 110 (such as node 110-1) for the group and more specifically controls the replication management services for the replication partner 108. In general, the group management engine 117 initiates and drives its associated replication group (i.e., the local replication partner 108) and communications with the remote replication partner 120. Each storage node 110 may also contain a data services engine 115, another daemon, in accordance with example implementations. Thus, in accordance with example implementations, if the local replication partner 108 has N storage nodes 110, then there are N instances of the data services engine 115 and one instance of the group management engine 117. In general, the data services engine 115 is responsible for data movement between the two partnership groups for purposes of transferring replication data between the groups. The data services engines 115 of the local replication partner 108 communicate data with corresponding data services engines 127 of the storage nodes 121 of the remote replication partner 120. Similar to the storage nodes 110, in accordance with example implementations, a single storage node 121 may contain a single group management engine 125 for purposes of providing replication management services for the particular replication group, and each storage node 121 of the replication group may contain a data services engine 127. Similar to the data services engine 115 and the group management engine 117, the data services engine 127 and the group management engine 125 may be background processes, or daemons, formed by the execution of machine executable instructions that are stored in a non-transitory memory 123 and executed by one or multiple hardware processors 124.

In accordance with example implementations, the public network fabric 129 and the private network fabric 127 may include any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), or any combination thereof. The public network fabric 129 may include any of the foregoing networks, as well as global networks (e.g., network fabric communicating Internet traffic) or any combination thereof.

Figure 2:
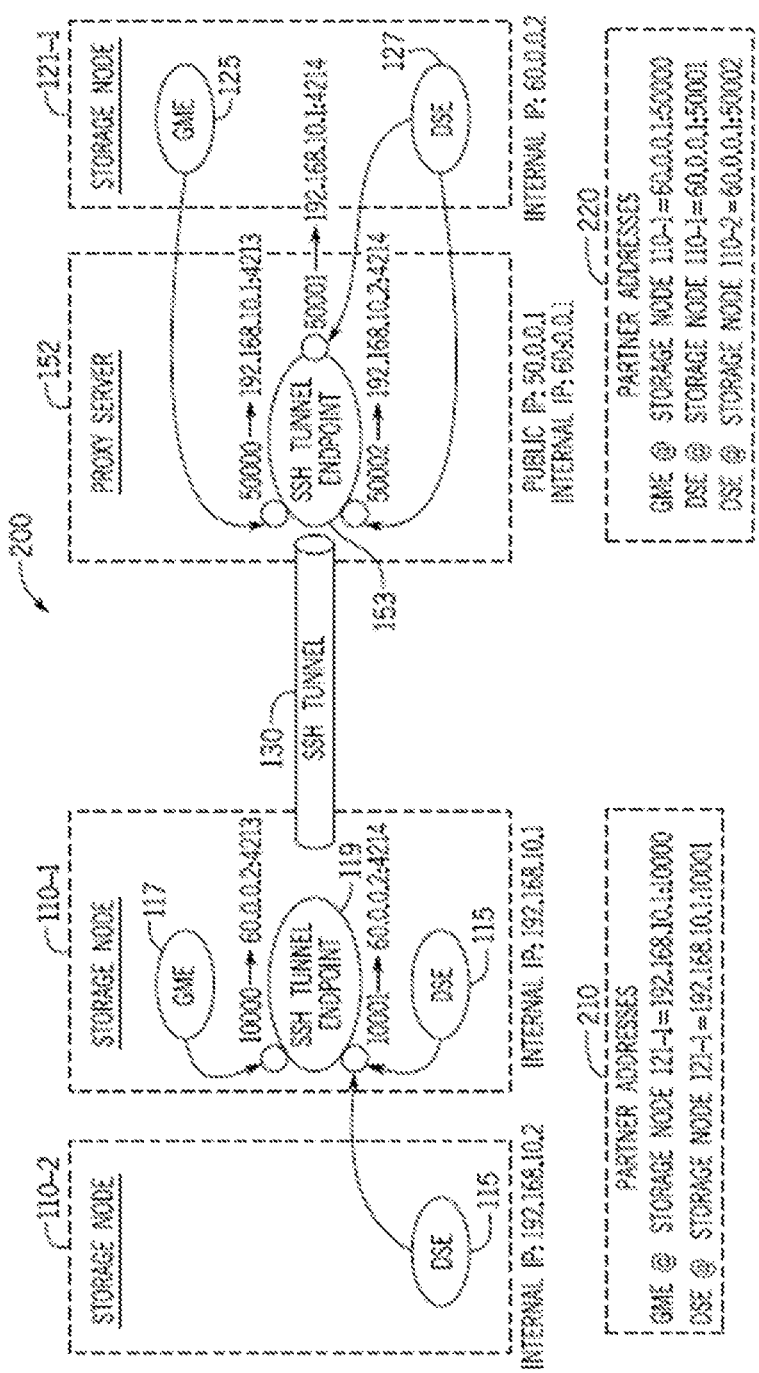
FIG. 2 is an illustration of local and remote port forwarding according to an example implementation.

FIG. 2 is an illustration 200 of local and remote port forwarding used in connection with the SSH tunnel 130 in accordance with example implementations. In particular, for this example, the storage node 110-1, the manager node for the local replication partner 108, has a private, internal Internet Protocol (IP) address of 192.168.10.1, and other storage nodes 110 (such as storage node 110-2) have other corresponding private, internal IP addresses, such as address 192.168.10.2 for the storage node 110-2. For the remote replication partner 120, the proxy server 152 has a public IP address 50.0.0.1 and a corresponding private, internal IP address 60.0.0.1. Moreover, similar to the storage nodes 110, the storage nodes 121 have corresponding private, internal IP addresses, such as internal IP address 60.0.0.2 for the storage node 121-1 which is the manager node for the remote replication partner 120. In a similar manner, other storage nodes 121 may have other corresponding private, internal IP addresses.

For purposes of the group management engines 117 and 125 communicating with each other, the SSH tunnel endpoint 153 provided by the proxy server 152 and a corresponding SSH tunnel endpoint 119 provided by the storage node 110-1 perform port translations. In this manner, in accordance with some implementations, when the agent 180 configures the proxy server 152 with the port translations, the agent 180 may request port translations similar to the following example: ssh<user>@50.0.0.1-L 10000:60.0.0.2: 4213-L 10001:60.0.0.2:4214-R 50000:192.168.10.1:4213-R 50001:192.168.1:4214-R 50002:192.168.10.2:4214

The above example sets forth local port forwarding and reverse, or remote, port forwarding translations for the public IP address 50.0.0.1 of the proxy server 152. The delimiter "-L" signifies a local port forwarding translation immediately preceding the "-L" delimiter; and the "-R" delimiter signifies a remote port forwarding translation immediately following the delimiter. For example, the first local port forwarding translation "10000:60.0.0.2:4213" represents that an incoming communication from the SSH tunnel 130 (to the remote replication partner 120) directed to port 10000 is to be redirected by the proxy server 152 to port 4213 at internal IP address 60.0.0.2 (i.e., the address/port of the general management engine 125 of the storage node 121-1). In words, the general management engine 117 sends communications to the group management engine 125 to port 10000, and the SSH tunnel endpoint 153 directs these communications to the private IP address/port of the general management engine 125.

As another example, the local port forwarding translation "10001:60.0.0.2:4214" in the example expression above represents another local port translation for the SSH tunnel endpoint 153 in which the endpoint 153 redirects traffic directed to port 10001 to be internal IP address 60.0.0.2: 4214, which is the address/port of the data services engine 127 of the storage node 121-1. In words, a data services engine 115 of the local replication partner 108 may send data to a data services engine 127 of the storage node 121-1 using port 10001, and the SSH tunnel endpoint 153 directs this data to the appropriate private IP address/port of the storage node 121-1 assigned to the data services engine 127.

The example expression above also sets forth remote port forwarding translations, which are handled by the SSH tunnel endpoint 119 of the storage node 110-1. In this manner, in accordance with example implementations, the proxy server 152 is configured with the remote port forwarding; and when the storage node 110-1 initiates the SSH connection, the proxy server 152 sets up the SSH tunnel endpoint 119 for the remote port forwarding. As an example, the remote port forwarding "50000:192.168.10.1:4213" represents that the SSH tunnel endpoint 119 translates incoming traffic from the SSH tunnel 130 to internal IP address 192.168.10.1:4213, which is the address/port of the general management engine 117. Likewise, the remote port forwarding set forth above sets forth remote port forwarding for the data services engine 115 of the storage node 110-2 and the data services engine 115 of the storage node 110-1.

Thus, as depicted at reference numeral 210 of FIG. 2, the general management engine 117 of the storage node 110-1 may access the general management engine 121-1 using partner address 192.168.10.1:10000, and the data service engines 115 of the storage nodes 110 may access the data services engines 127 of the storage nodes 121 using partner address 192.168.10.1:10001. On the other end of the SSH tunnel 130, the general management engine 125 of the storage node 121-1 may access the general management engine 117 of the storage node 110-1 using the address 60.0.0.1:50000; the data services engine 127 of the storage node 121-1 may communicate with the data services engine 115 of the storage node 110-1 using the partner address 60.0.0.1:50001; and the data services engine 127 may communicate with the data services engine 115 of the storage node 110-2 using the partner address 60.0.0.1:50002.

Figure 3A:
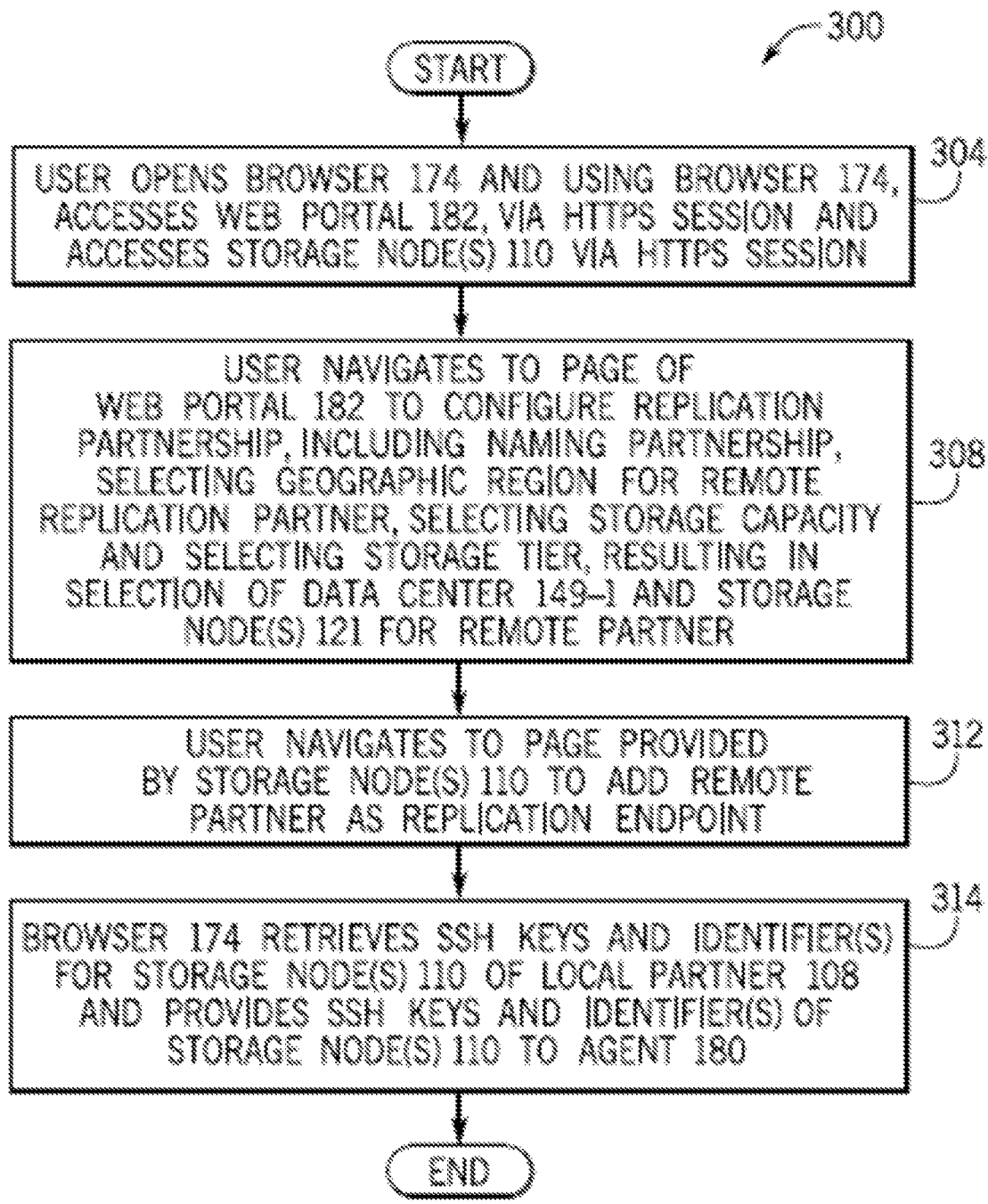
FIG. 3A depicts a flow diagram of a technique performed by a user via a browser to set up a replication partnership in which replication data is communicated over a public network according to an example implementation.
Figure 3B:
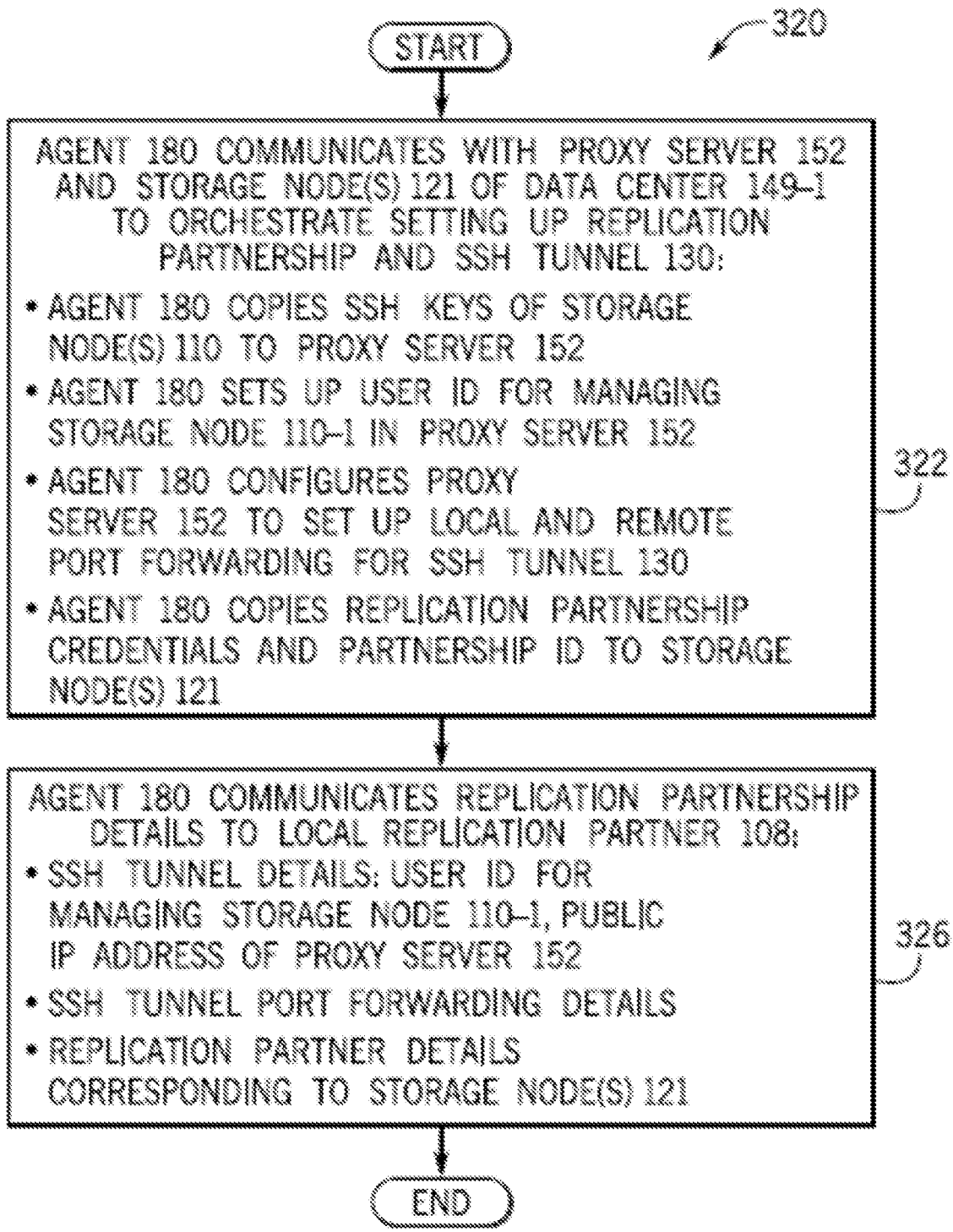
FIG. 3B depicts a flow diagram of a technique performed by an agent to set up the replication partnership according to an example implementation.
Figure 3C:
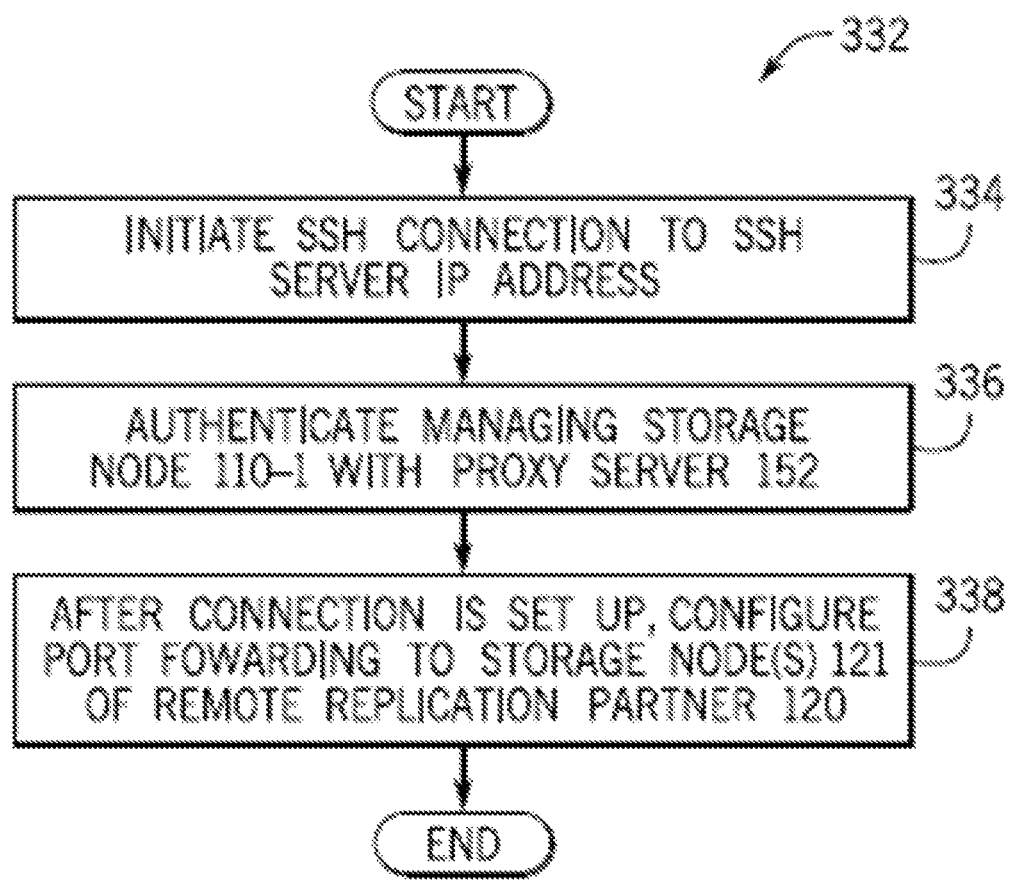
FIG. 3C depicts a flow diagram of a technique performed by a proxy server to initiate the replication partnership according to an example implementation.

FIGS. 3A, 3B and 3C depict example techniques 300, 320, and 332, respectively, which may be used, in accordance with some implementations, to setup and initiate a replication partnership and associated secure communication channel. The example technique 300 may be performed, for example, by a user via a browser, such as the browser 174 described above. The example technique 320 may be performed, for example, by an agent, such as the agent 180 described above, in response to messages received from the browser. The example technique 332 may be performed, for example, by a managing node of a local replication partner, such as the managing node 110-1 described above, in response to messages received from the agent 180.

Referring to FIG. 3A, the technique 300 includes, pursuant to block 304, the user opening the browser 174 and using the browser 174 to access the web portal 184 via an HTTPS session and access the storage node(s) 110 (i.e., the nodes for the local replication partner) via an HTTPS session.

Pursuant to block 308, the user may then navigate to a page of the web portal 182 to configure the replication partnership, including naming the partnership, selecting a geographic region for the replication partner, selecting a capacity for the replication partner and selecting a storage tier. The user may navigate, as depicted in block 312, to a page provided by the storage node(s) 110 (a page provided by the managing storage node 110, for ex example) to provide input to add the remote replication partner as the replication endpoint.

Pursuant to block 314, the technique 300 includes the user retrieving, via the browser 174, the SSH keys (i.e., an identifying key pair) and identifiers of the storage node(s) 110 of the local replication partner 110 and providing, via the browser 174, the SSH keys and identifiers to the agent 180.

Referring to FIG. 3B and the technique 320, pursuant to block 322, the agent 180 may, in response to receiving configuration information from a user, select a particular data center 149 and group of one or multiple storage nodes 121 to form a replication partner 120. Pursuant to block 324, the agent 180 may communicate with the proxy server 152 and the selected storage node(s) 121 of the selected data-center 149 to orchestrate the setting up of the replication partnership 120 and the SSH tunnel 130. For example, this orchestration may include the agent 180 copying the SSH keys of the storage nodes 110 to the proxy server 152; setting up a user ID for the managing storage node 110-1 in the proxy server 152; configuring the proxy server 152 to set up local and remote port forwarding for the SSH tunnel 130; and copying replication partnership credentials and replication partnership ID to the storage node(s) 121 of the remote replication partner 120.

Pursuant to block 326, the agent 180 communicates replication partnership details to the local replication partner 108, where the replication partnership details include: the SSH tunnel 130 details, including the user ID for the storage node 110-1 and the public IP address of the proxy server 152; SSH tunnel 130 port forwarding details; and replication partner 120 details corresponding to the storage node(s) 121.

The technique 320 described above may be embodied (in whole or in part) in machine readable instructions that, when executed by a processor of the agent 180, cause the agent 180 to perform (some or all of) the operations of the example technique 320. The machine readable instructions may be stored on a non-transitory storage medium, which may include volatile media such as random-access-memory (RAM) (e.g., DRAM, SRAM, etc.) and/or persistent (non-volatile) media such as non-volatile memory (e.g., PROM, EPROM, EEPROM, NVRAM, etc.), flash drives, hard disk drives, optical disks, etc.

Referring to FIG. 3C and the technique 332, in block 334, the managing node 110-1 of the local replication partner 108 may, in response to receiving replication partnership details from the agent 180, initiate (block 334) the SSH connection using the public IP address of the proxy server 152 and authenticate itself with the proxy server 152, pursuant to block 336. In accordance with block 338, after the SSH connection is set up, the managing storage node 110-1 may then configure the remote port forwarding to the storage node(s) 121 of the remote replication partner 120.

The technique 332 described above may be embodied (in whole or in part) in machine readable instructions that, when executed by a processor of the managing node 121-1, cause the managing node 121-1 to perform (some or all of) the operations of the example technique 330. The machine readable instructions may be stored on a non-transitory storage medium, which may include volatile media such as random-access-memory (RAM) (e.g., DRAM, SRAM, etc.) and/or persistent (non-volatile) media such as non-volatile memory (e.g., PROM, EPROM, EEPROM, NVRAM, etc.), flash drives, hard disk drives, optical disks, etc.

Figure 4:
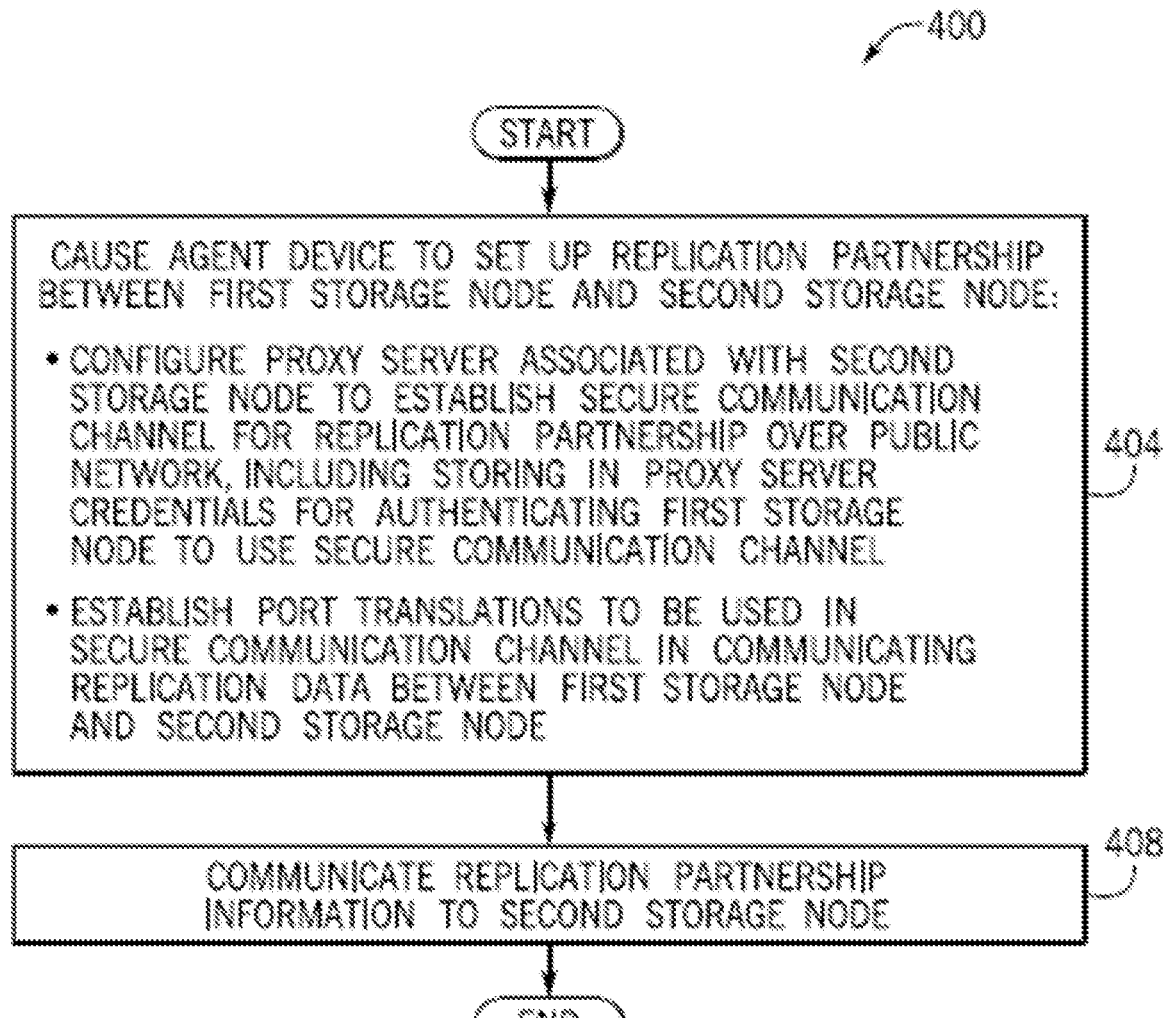
FIG. 4 is a flow diagram depicting a technique to setup a proxy server for a replication partnership in which replication data is communicated over a public network according to an example implementation.

Referring to FIG. 4 thus, in accordance with example implementations, a technique 400 may include causing (block 404) an agent device to set up a replication partnership between a first storage node and a second storage. Causing the agent device to setup the replication partnership may include configuring a proxy server that is associated with the second storage node to establish a secure communication channel for the replication partnership over a public network. Configuring the proxy server may include storing in the proxy server credentials for authenticating the first storage node to use the secure communication channel; and establishing port translations to be used in the secure communication channel in communicating replication data between the first storage node and the second storage node. The technique 400 may include communicating replication partnership information to the second node, pursuant to block 408.

Figure 5:
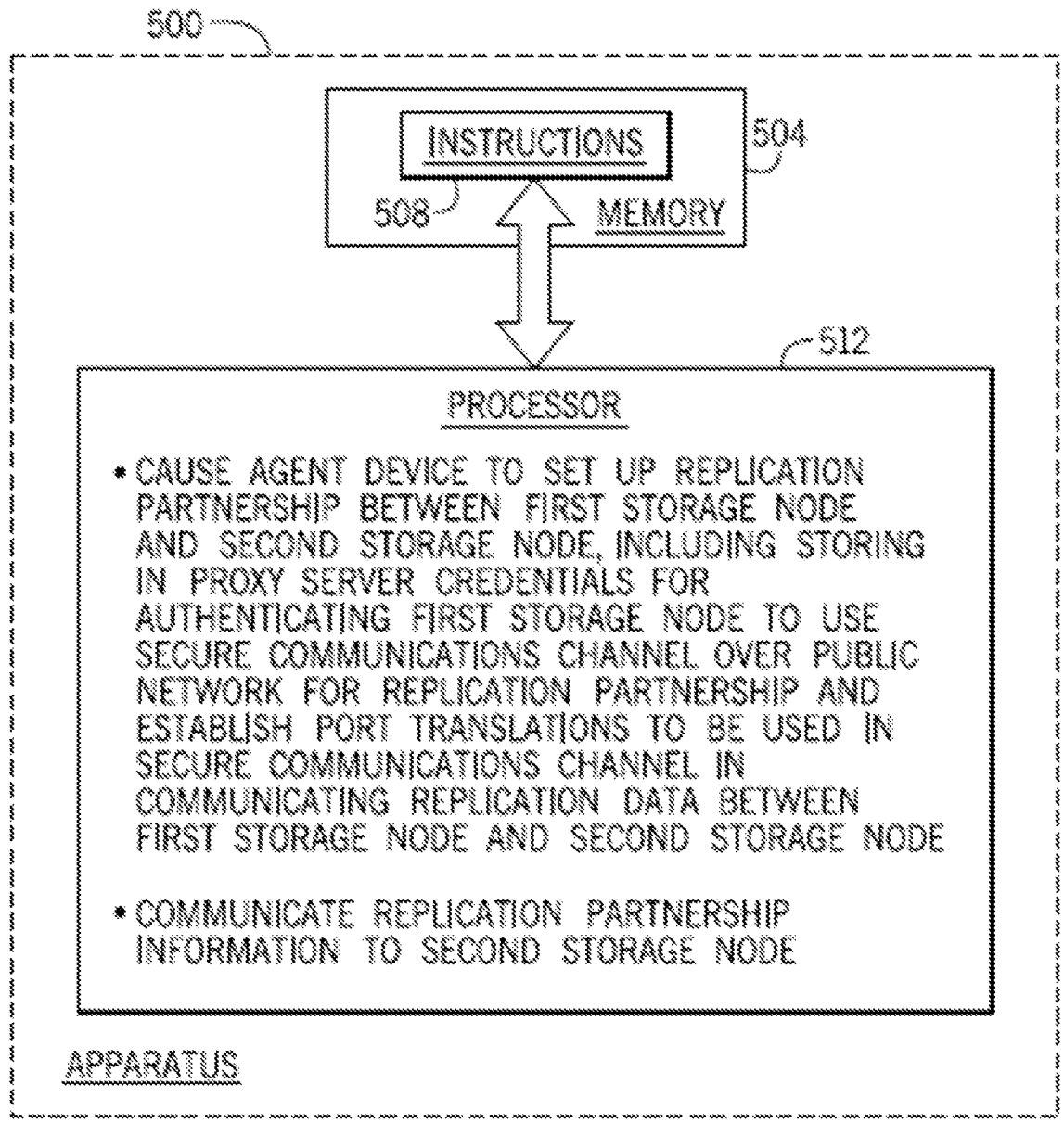
FIG. 5 is a schematic diagram of an apparatus that provides a proxy for a storage array of a replication partnership according to an example implementation.

Referring to FIG. 5, in accordance with example implementations, an apparatus 500 includes at least one processor 512 and a memory 504. The memory 504 stores instructions 508 that, when executed by the processor(s) 512, cause the processor(s) 512 to set up a replication partnership between a first storage node and a second storage node. More specifically, in accordance with example implementations, the instructions 508, when executed by the processor(s) 512, cause the processor(s) 512 to store in a proxy server credentials for authenticating the first storage node to use a secure communication channel over a public network for the replication partnership; and establish port translations to be used in the secure communication channel to communicate replication data between the first storage node and the second storage node. The instructions 508, when executed by the processor(s) 512, cause the processor(s) 512 to communicate replication partnership information to the second storage node.

The memory 504 may include any non-transitory storage medium, which may include volatile media, such as random-access-memory (RAM) (e.g., DRAM, SRAM, etc.) and/or persistent (non-volatile) media such as non-volatile memory (e.g., PROM, EPROM, EEPROM, NVRAM, etc.), flash drives, hard disk drives, optical disks, etc.

Figure 6:
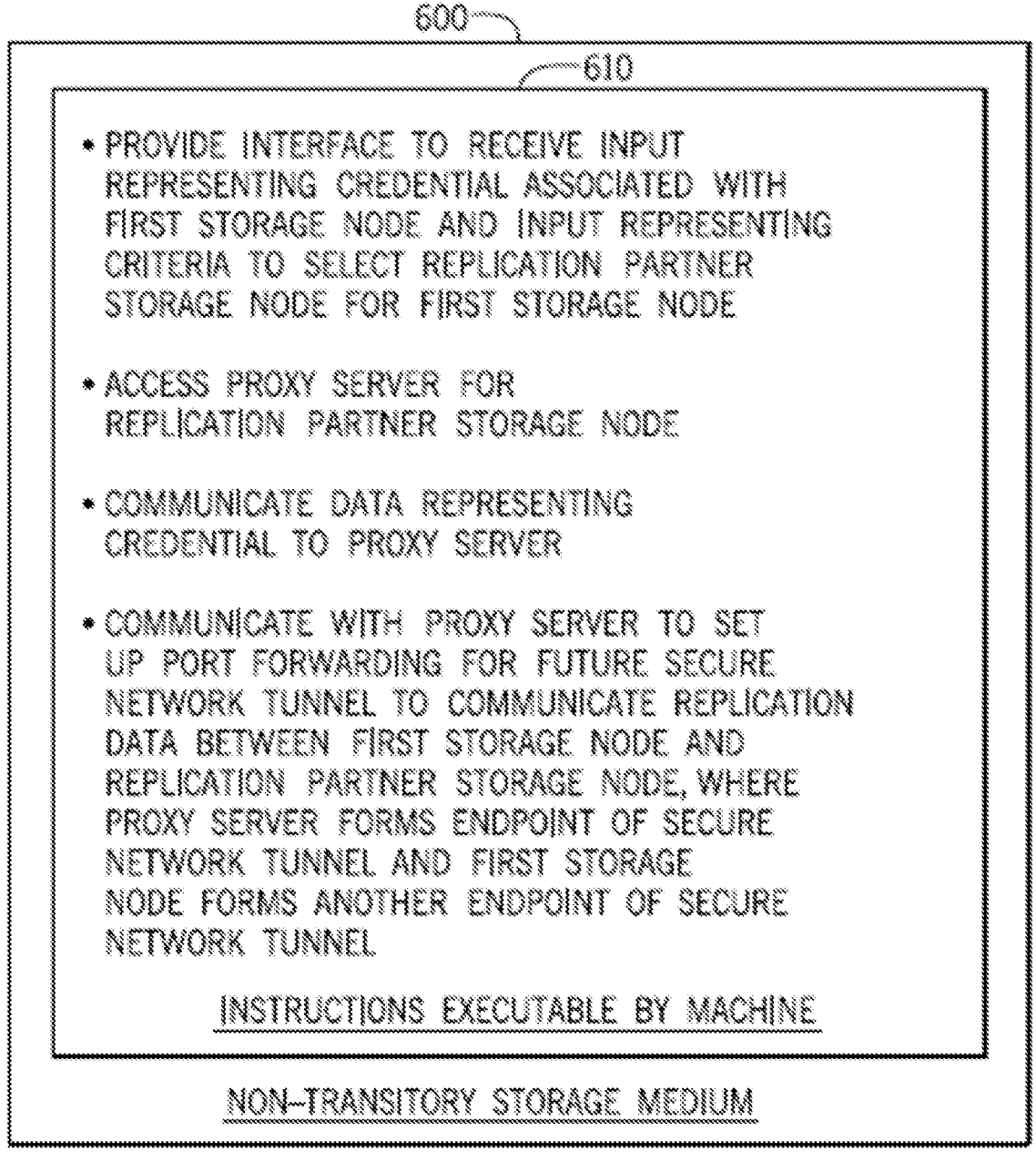
FIG. 6 is an illustration of instructions stored on a non-transitory storage medium, which are executable by a machine to setup a secure network tunnel to communicate replication data between storage nodes according to an example implementation.

Referring to FIG. 6, in accordance with example implementations, a non-transitory storage medium 600 stores machine executable instructions 610. In some examples, the instructions 610 may, when executed by a machine (a processor-based machine, for example), form an agent, such as the agent 180, that is to orchestrate establishment of a replication partnership between a local replication partner and a remote replication partner. For example, the instructions 610 may be such that, when they are executed by a machine, they cause the machine to provide an interface to receive input representing a credential associated with a first storage node and input representing criteria to select a replication partner storage node for the first storage node; access a proxy server for the replication partner storage node; communicate data representing the credential to the proxy server; and communicate with the proxy server to set up port forwarding for a future secure network tunnel to communicate replication data between the first storage node and the replication partner storage node, where the proxy server forms an endpoint of the secure network tunnel. The first storage node forms another endpoint of the secure network tunnel.

Figure 7A:
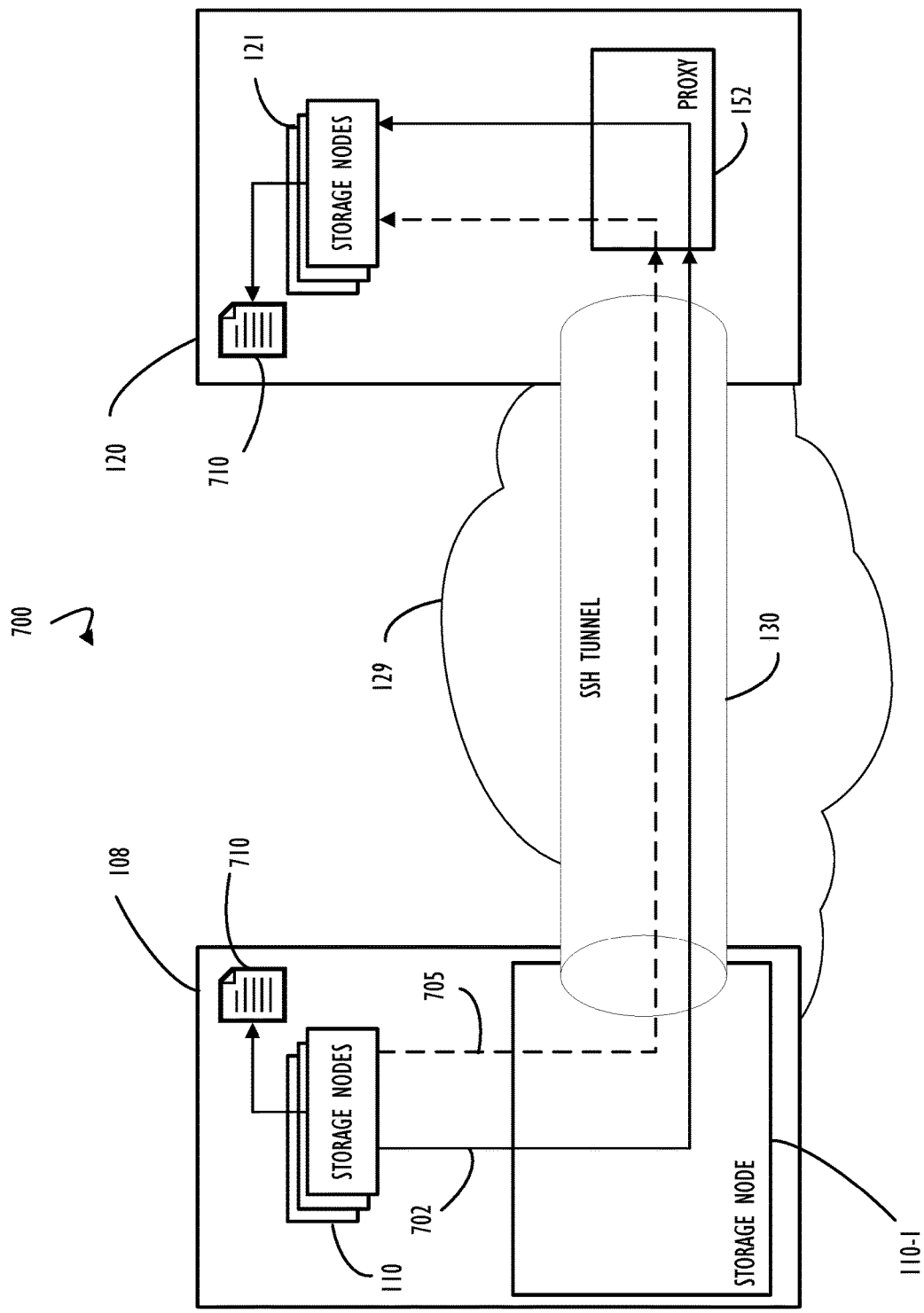
FIG. 7A is a functional block diagram representing a detailed example of using pre-established port offsets for port forwarding configurations between the two replication partners when a tunnel connection is established between the two replication partners according to an example implementation.

Referring to FIG. 7A, in accordance with example implementations, local replication partner 108 has established a secure communication tunnel 130 to remote replication partner 120 via public network fabric 129. One storage node within the infrastructure of the local replication partner 108 may be acting as manager 110-1 for the group of storage nodes 110. The managing node may establish one or more port forwarding rules via the tunnel endpoint connected to proxy 152 through adding a pre-established port offset (e.g., an offset to a well-known port). For example, pre-established offsets stored in table 710 may be used relative to a connection port. The connection port may be a well-known port and may be used to establish the secure tunnel connection (e.g., using the well-known TCP/IP port for SSH). The connection port may also be thought of as a "base port" to which pre-established port offsets may be applied (e.g., base port plus offset equals communication port).

The port forwarding configuration established by using pre-established port offsets table 710 with the base port (e.g., by adding an offset for a specific port to the base port) may facilitate communication between any of the local replication partner's 108 storage nodes 110 and the remote replication partner's 120 storage nodes 121 as illustrated by link 702. Services between the local 108 and remote 120 replication partners may orchestrate the exchange of encryption keys required to support securely encrypting data that is to be replicated. The orchestration of the encryption keys, having concluded successfully, may allow local 108 and remote 120 replication partners to commence the negotiation of any additional port forwarding connections required to successfully commence replication activities. Example additional port forwarding configurations are illustrated by link 705 (illustrated as a dashed line in FIG. 7A).

Figure 7B:
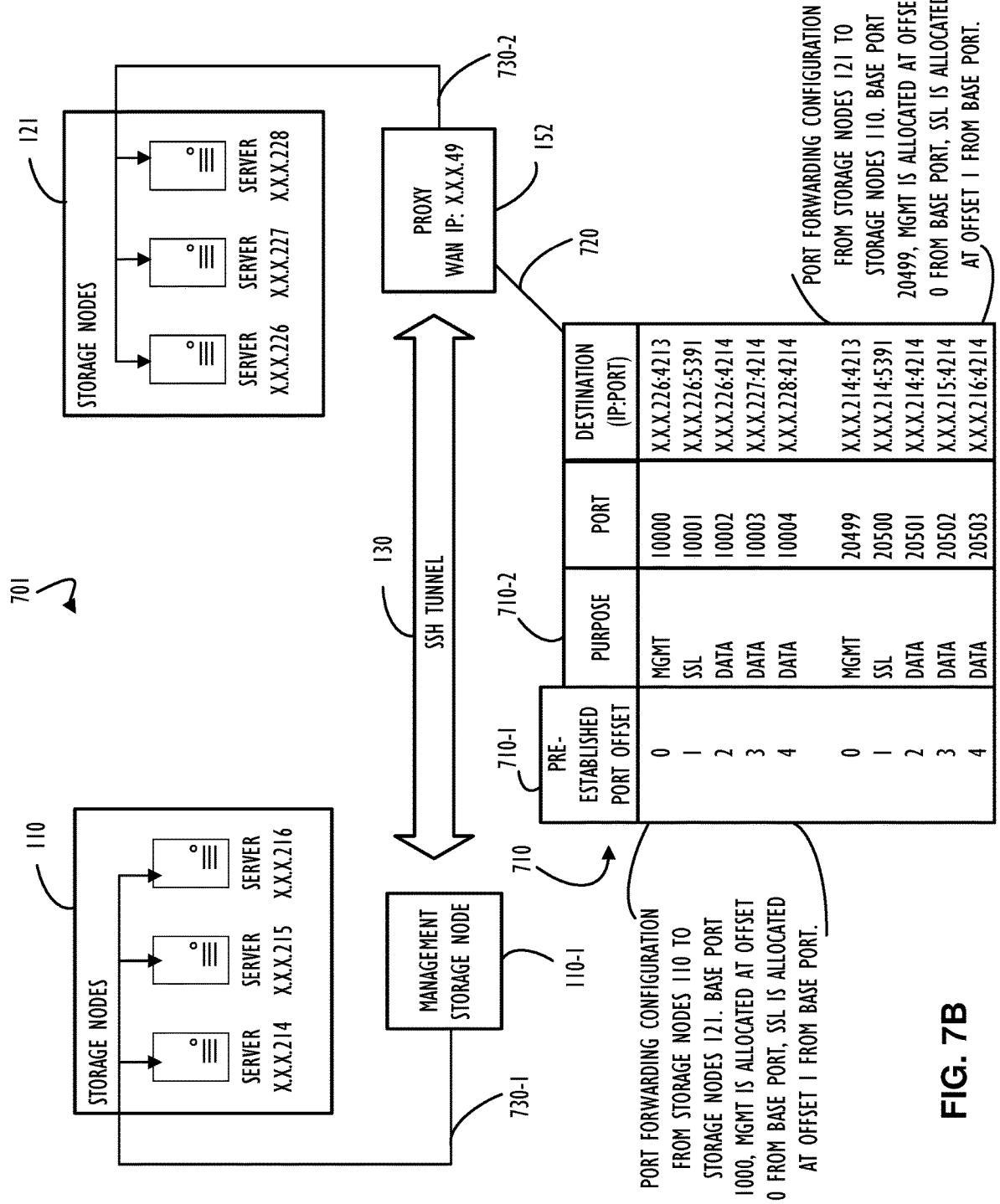
FIG. 7B is a function block diagram further illustrating the example of FIG. 7A using example values for pre-established port offsets according to an example implementation.

Referring now to FIG. 7B, in accordance with this or other possible examples, block diagram 701 shows an example of where storage node 110-1 may act as a manager for storage nodes 110 and may have established a link such as SSH Tunnel 130 with proxy node 152. Storage node 110-1, in this example acting as a manager for other storage nodes, links with each storage node 110 through local connection 730-1. This example shows a limited number of storage nodes 110 but the number of storage nodes could be any number. Proxy 152 similarly shows a link with each storage node 121 over local connection 730-2 and the number of storage nodes 121 may be any number of nodes.

Pre-established port offsets table 710 shows an example of the overall port mapping that has been established, for this specific example, by proxy 152 when the link 130 was connected. Referring to the pre-established port offsets table 710 as illustrated in FIG. 7B, elements of pre-established port offsets table 710 have been enumerated as an example to illustrate the pre-established port offset 710-1 and the purpose 710-2 of each pre-established port offset, respectively. The proxy node 152, having established the port mapping and also being aware of pre-established port offsets table 710, may store the port mappings in memory 720 to allow replication services to utilize the port mappings for activities such as data replication. The set of port mappings may be collectively referred to as a "port forwarding configuration" to allow data communication on any required number of communication links between a source and a destination. Each communication link may have a different purpose based on a specific implementation criterion. In the example of FIG. 7B, a first port forwarding configuration known by proxy 152 includes a set of links to use to communicate from storage nodes 110 to storage nodes 121. In this example, replication may be considered to be taking place from storage nodes 110 as a "first" side of the replication to storage nodes 121 as a "second" side of the replication. In this example, the base port for this set of communication links (e.g., port forwarding configuration) is 10000 and the base port is used as a management link. In this example, the offset for the management link is illustrated to be 0 so management activity takes place on base port 10000. Also, in this example, SSL is assigned an offset of 1 so SSL communication is performed at offset 1 from base port 10000 (i.e., on port 10001 because 10000+1=10001) on storage node 110-1. This specific example includes 3 data links identified with offsets 2, 3, and 4, respectively. Accordingly, data (e.g., for replication) may be transmitted from storage nodes 110 to proxy 152 on ports 10002, 10003, and 10004 (e.g., by adding the offset to the base port of 10000). Although offsets in this example are sequential, offsets may be any pre-established number and do not have to be sequential.

A second set of port mappings, representing a second port forwarding configuration in this example, is also illustrated in FIG. 7B table 710 to represent a set of links to use to communicate between storage nodes 121 and storage nodes 110 (i.e., to facilitate communication the reverse direction of the previously discussed port forwarding configuration). The ports used for this port forwarding configuration, as illustrated in this specific example, begin with a base port of 20499 used as a management port (again with offset 0). Accordingly, SSL having a pre-determined offset of 1 utilizes port 20500 (i.e., 20499+1=20500). The destination column of table 710 illustrates where a communication received at proxy 152 will be forwarded. Specifically, a communication received at port 20499 on proxy server 152 will be sent to X.X.X.214 (IP address) and port 4213 on a server in storage nodes 110. Ports 4213, 5391, and 4214 (in this example) represent ports configured as part of software installation and configuration of the replication software on each participating node.

Using the above established port forwarding of proxy 152 (e.g., proxy 152 simply passes data received at one inbound port to a corresponding outbound port and thus destination), data replication may be performed by identifying one storage node as a source of replication and another storage node as a destination for the replicated data. Different communication channels (e.g., set up according to a number of pre-established offsets) may be used between devices to exchange different types of information. As many different channels may be established as desired for information segregation based on different implementation requirements.

Continuing with this example, replication may utilize the first storage node from storage nodes 121, as illustrated in FIG. 7B, with the representative Internet Protocol (IP) address X.X.X.226 as the source of replication and utilize the node with the representative IP address X.X.X.214 from storage nodes 110, as illustrated in FIG. 7B, as the destination of the replication. Software that is executing on a first "side" of the replication may connect to proxy node 152 at port 20499 to establish one direction of communication. Software that is executing on the second side of the replication may connect to node 110-1 at port 10000 to establish the other direction of communication. Proxy node 152 may utilize the established forwarded ports (e.g., a port forwarding configuration) to route the connection to one storage node in the group of storage nodes 121 with the IP address X.X.X.226, which in this example is at a physical port 4214 in this example (e.g., pre-configured on that device). The software may similarly establish a connection to the replication destination node by connecting to proxy node 152 at port 20499 to establish the destination storage node when port 20499 is calculated by the software using the pre-established offset from the base port (in this case 20499 for base port and 0 for offset). Thus, proxy 152 may utilize the established port forwarding configuration to route the connection to one storage node in the group of storage nodes 110 with the address X.X.X.214 at a physical port 4214. Having established connections to both the replication source and destination through proxy node 152, replication software may therefore utilize a combination of a base port and port offsets to commence secure replication. As mentioned above, different numbers of communication links may be used. In this example there are two links with one each for management and SSL and three links for data transfer (each with different pre-established offsets).

Figure 8:
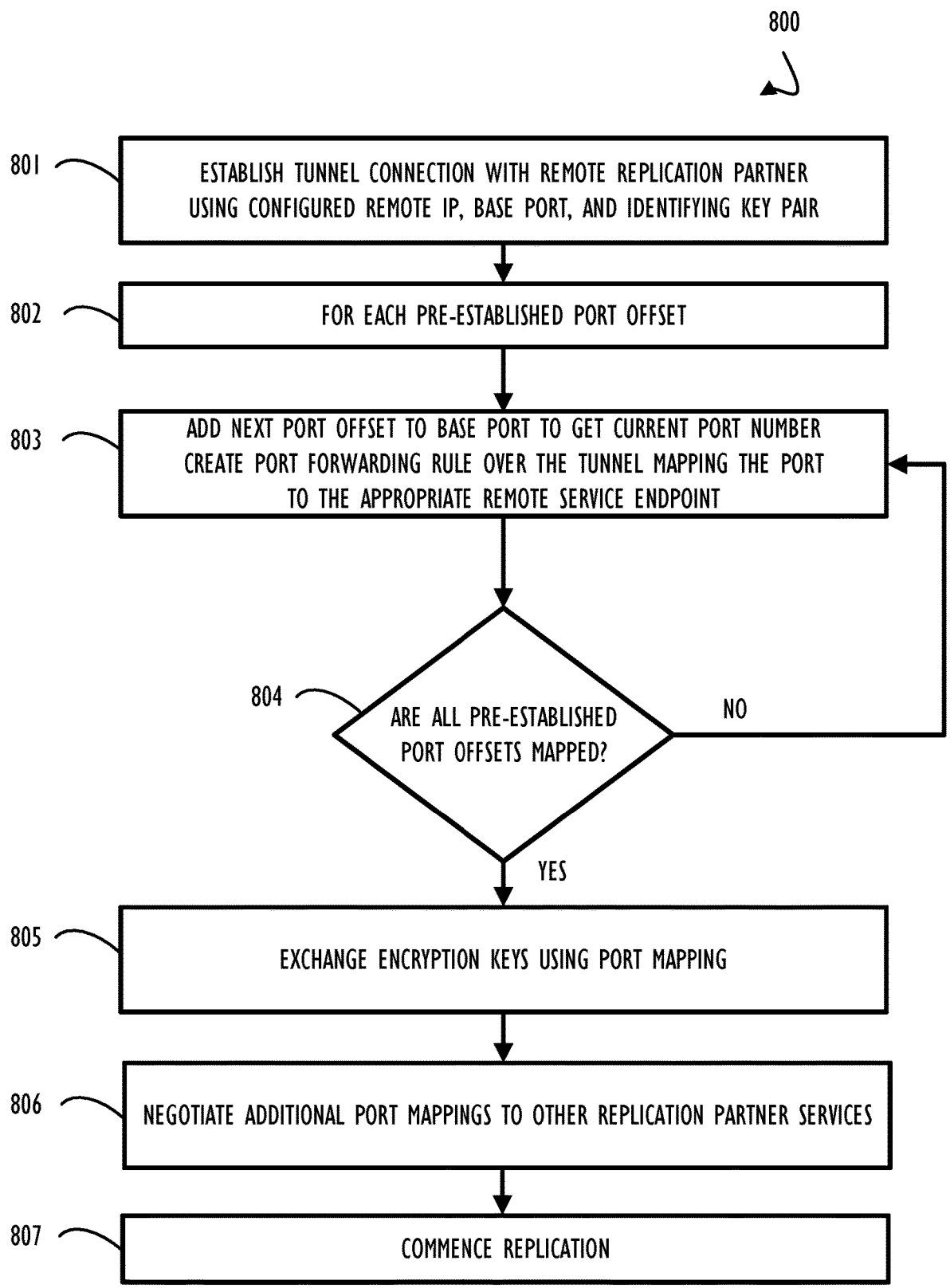
FIG. 8 is an example flowchart illustrating establishing a secure communication channel between replication partners and configuring the port forwarding with pre-established port offsets before commencing to negotiate other port forwarding configurations according to an example implementation.

Referring to FIG. 8, a flowchart 800 describes an example method of replication activities using port forwarding configurations established from the pre-established port offsets. A secure connection between the local and remote replication partners may be established (block 801). Using a pre-established port offset (block 802) a port forwarding configuration may be created by adding the pre-established port offset to the base port. Note, in some implementations, the base port may be a well-known port (e.g., the well-known port assigned to SSH). Depending on implementation requirements, any number of offsets may be pre-established to exchange different types of information between a source and destination in a secure manner. This offset port establishment process may be repeated, in this example, until all port forwarding configurations are created based on the pre-established port offsets (block 804). Encryption keys may be exchanged (block 805) before continuing to negotiate additional port forwarding configurations (block 806) to facilitate commencement of replication activities (block 807).

Figure 9:
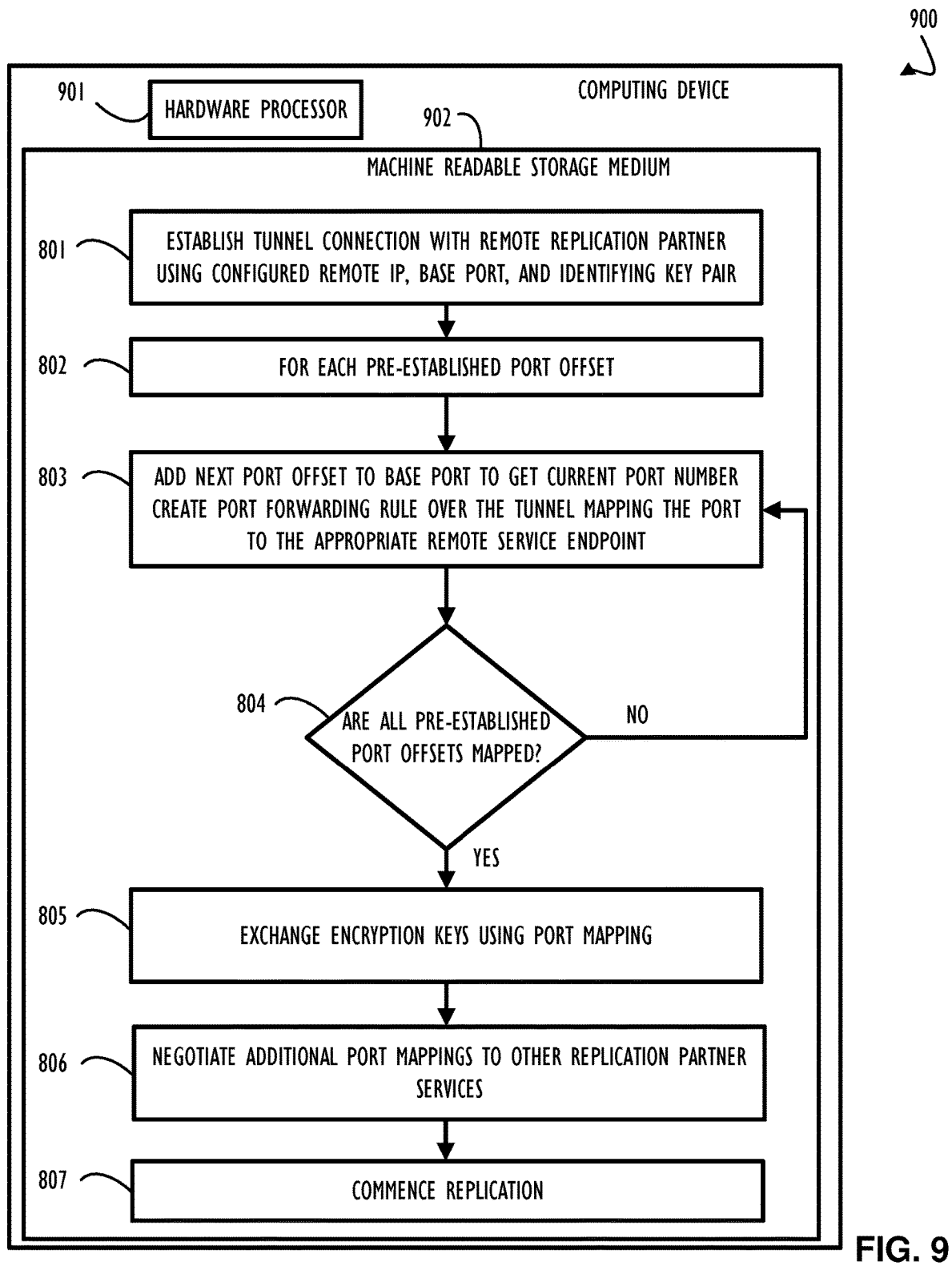
FIG. 9 is an example computing device with a hardware processor and accessible machine-readable instructions that may be used to establish a secure communication channel between replication partners according to an example implementation.

FIG. 9 is an example computing device 900, with a hardware processor 901, and accessible machine-readable instructions stored on a machine-readable medium 902 for executing replication activities, according to one or more disclosed example implementations. FIG. 9 illustrates computing device 900 configured to perform the flow of method 800 as an example. However, computing device 900 may also be configured to perform the flow of other methods, techniques, functions, or processes described in this disclosure. In this example of FIG. 9, machine-readable storage medium 902 includes instructions to cause hardware processor 901 to perform blocks 801-807 discussed above with reference to FIG. 8.

A machine-readable storage medium, such as 902 of FIG. 9, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 10:
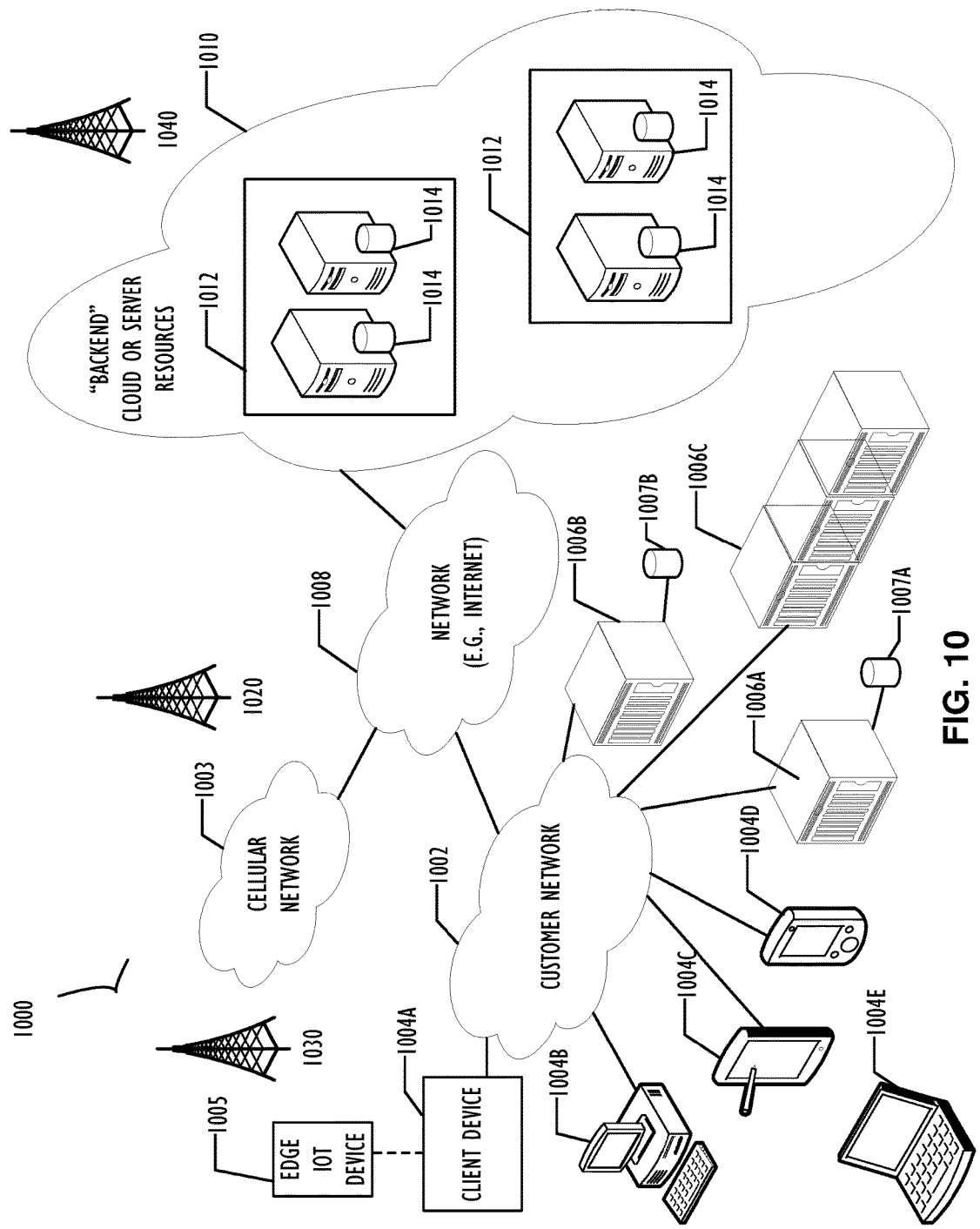
FIG. 10 represents a computer network infrastructure that may be used to implement all or part of the disclosed replication techniques, according to one or more disclosed implementations.
Figure 11:
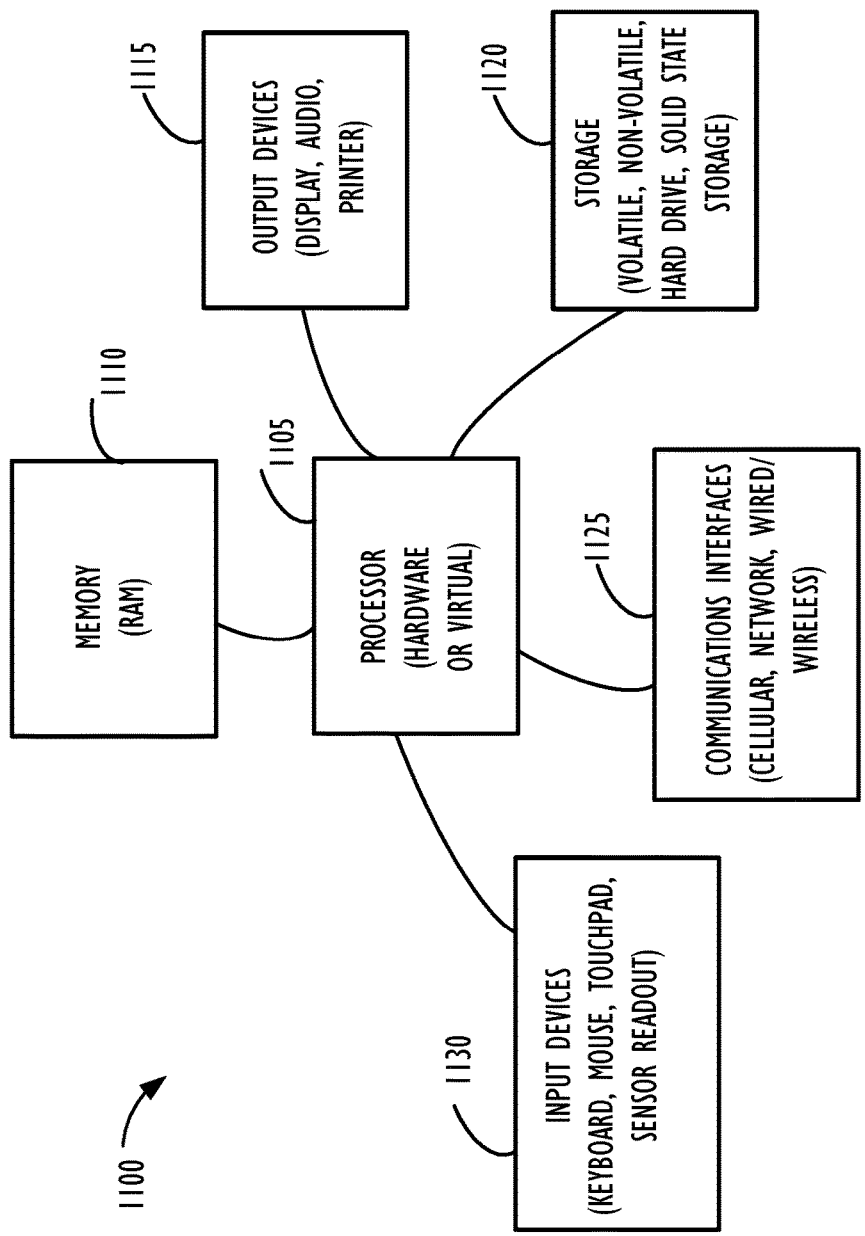
FIG. 11 illustrates a computer processing device that may be used to implement the functions, modules, processing platforms, execution platforms, communication devices, and other methods and processes of this disclosure.

FIG. 10 represents a computer network infrastructure that may be used to implement all or part of the disclosed replication techniques, according to one or more disclosed implementations. Network infrastructure 1000 includes a set of networks where embodiments of the present disclosure may operate. Network infrastructure 1000 comprises a customer network 1002, network 1008, cellular network 1003, and a cloud service provider network 1010. In one embodiment, the customer network 1002 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 1002 represents an enterprise network that could include or be communicatively coupled to one or more local area networks (LANs), virtual networks, data centers, and/or other remote networks (e.g., 1008, 1010). In the context of the present disclosure, customer network 1002 may include multiple devices configured with the disclosed replication of encrypted volume techniques such as those described above. Also, one of the many computer storage resources in customer network 1002 (or other networks shown) may be configured to store an encrypted volume.

As shown in FIG. 10, customer network 1002 may be connected to one or more client devices 1004A-E and allow the client devices 1004A-E to communicate with each other and/or with cloud service provider network 1010, via network 1008 (e.g., Internet). Client devices 1004A-E may be computing systems such as desktop computer 1004B, tablet computer 1004C, mobile phone 1004D, laptop computer (shown as wireless) 1004E, and/or other types of computing systems generically shown as client device 1004A.

Network infrastructure 1000 may also include other types of devices generally referred to as Internet of Things (IoT) (e.g., edge IOT device 1005) that may be configured to send and receive information via a network to access cloud computing services or interact with a remote web browser application (e.g., to receive configuration information).

FIG. 10 also illustrates that customer network 1002 includes local compute resources 1006A-C that may include a server, access point, router, or other device configured to provide for local computational resources and/or facilitate communication amongst networks and devices. For example, local compute resources 1006A-C may be one or more physical local hardware devices, such as different configurations of storage nodes outlined above. Local compute resources 1006A-C may also facilitate communication between other external applications, data sources (e.g., 1007A and 1007B), and services, and customer network 1002. Local compute resource 1006C illustrates a possible processing system cluster with three nodes. Of course, any number of nodes is possible, but three are shown in this example for illustrative purposes.

Network infrastructure 1000 also includes cellular network 1003 for use with mobile communication devices. Mobile cellular networks support mobile phones and many other types of mobile devices such as laptops etc. Mobile devices in network infrastructure 1000 are illustrated as mobile phone 1004D, laptop computer 1004E, and tablet computer 1004C. A mobile device such as mobile phone 1004D may interact with one or more mobile provider networks as the mobile device moves, typically interacting with a plurality of mobile network towers 1020, 1030, and 1040 for connecting to the cellular network 1003. In the context of the current replication of encrypted volumes and secure communication techniques, user alerts and informational messages as to establishing and maintaining encrypted volumes may be configured to provide an end-user notification. In some implementations, this notification may be provided through network infrastructure 1000 directly to a system administrators cellular phone.

Although referred to as a cellular network in FIG. 10, a mobile device may interact with towers of more than one provider network, as well as with multiple non-cellular devices such as wireless access points and routers (e.g., local compute resources 1006A-C). In addition, the mobile devices may interact with other mobile devices or with non-mobile devices such as desktop computer 1004B and various types of client device 1004A for desired services. Although not specifically illustrated in FIG. 10, customer network 1002 may also include a dedicated network device (e.g., gateway or router) or a combination of network devices (not shown) that implement a customer firewall or intrusion protection system. These types of devices may be configured to provide an access path for communication of data related to encrypted volumes as discussed in this disclosure.

FIG. 10 illustrates that customer network 1002 is coupled to a network 1008. Network 1008 may include one or more computing networks available today, such as other LANs, wide area networks (WAN), the Internet, and/or other remote networks, in order to transfer data between client devices 1004A-D and cloud service provider network 1010. Each of the computing networks within network 1008 may contain wired and/or wireless programmable devices that operate in the electrical and/or optical domain.

In FIG. 10, cloud service provider network 1010 is illustrated as a remote network (e.g., a cloud network) that is able to communicate with client devices 1004A-E via customer network 1002 and network 1008. The cloud service provider network 1010 acts as a platform that provides additional computing resources to the client devices 1004A-E and/or customer network 1002. In one embodiment, cloud service provider network 1010 includes one or more data centers 1012 with one or more server instances 1014.

FIG. 11 illustrates a computer processing device 1100 that may be used to implement the functions, modules, processing platforms, execution platforms, communication devices, and other methods and processes of this disclosure. For example, storage nodes, proxy servers, network communication devices, and end-user devices shown explicitly or referenced in FIGS. 1-10. Computer processing device 1100 illustrated in FIG. 11 could represent a client device or a physical server device and include either hardware or virtual processor(s) depending on the level of abstraction of the computing device. In some instances (without abstraction), computing device 1100 and its elements, as shown in FIG. 11, each relate to physical hardware. Alternatively, in some instances one, more, or all of the elements could be implemented using emulators or virtual machines as levels of abstraction. In any case, no matter how many levels of abstraction away from the physical hardware, computing device 1100 at its lowest level may be implemented on physical hardware.

As also shown in FIG. 11, computing device 1100 may include one or more input devices 1130, such as a keyboard, mouse, touchpad, or sensor readout (e.g., biometric scanner) and one or more output devices 1115, such as displays, speakers for audio, or printers. Some devices may be configured as input/output devices also (e.g., a network interface or touchscreen display).

Computing device 1100 may also include communications interfaces 1125, such as a network communication unit that could include a wired communication component and/or a wireless communications component, which may be communicatively coupled to processor 1105. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 11, computing device 1100 includes a processing element such as processor 1105 that contains one or more hardware processors, where each hardware processor may have a single or multiple processor cores. In one embodiment, the processor 1105 may include at least one shared cache that stores data (e.g., computing instructions) that are utilized by one or more other components of processor 1105. For example, the shared cache may be a locally cached data stored in a memory for faster access by components of the processing elements that make up processor 1105. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 11, the processing elements that make up processor 1105 may also include one or more of other types of hardware processing components, such as graphics processing units (GPU), application specific integrated circuits (ASICs), field-programmable gate arrays (FPGAs), and/or digital signal processors (DSPs).

FIG. 11 illustrates that memory 1110 may be operatively and communicatively coupled to processor 1105. Memory 1110 may be a non-transitory medium configured to store various types of data. For example, memory 1110 may include one or more storage devices 1120 that comprise a non-volatile storage device and/or volatile memory. Volatile memory, such as random-access memory (RAM), can be any suitable non-permanent storage device. The non-volatile storage devices 1120 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 1120 may be used to store overflow data if allocated RAM is not large enough to hold all working data. The non-volatile storage devices 1120 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1105. In one embodiment, the compiling process of the software program may transform program code written in a programming language to another computer language such that the processor 1105 is able to execute the programming code. For example, the compiling process of the software program may generate an executable program that provides encoded instructions (e.g., machine code instructions) for processor 1105 to accomplish specific, non-generic, particular computing functions.

After the compiling process, the encoded instructions may then be loaded as computer executable instructions or process steps to processor 1105 from storage device 1120, from memory 1110, and/or embedded within processor 1105 (e.g., via a cache or on-board ROM). Processor 1105 may be configured to execute the stored instructions or process steps in order to perform instructions or process steps to transform the computing device into a non-generic, particular, specially programmed machine or apparatus. Stored data, e.g., data stored by a storage device 1120, may be accessed by processor 1105 during the execution of computer executable instructions or process steps to instruct one or more components within the computing device 1100.

A user interface (e.g., output devices 1115 and input devices 1130) can include a display, positional input device (such as a mouse, touchpad, touchscreen, or the like), keyboard, or other forms of user input and output devices. The user interface components may be communicatively coupled to processor 1105. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1100 may comprise other components well known in the art, such as sensors, powers sources, and/or analog-to-digital converters, not explicitly shown in FIG. 11.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. While the present disclosure has been described with respect to a limited number of implementations, those skilled in the art, having the benefit of this disclosure, will appreciate numerous modifications and variations therefrom. It is intended that the appended claims cover all such modifications and variations. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method comprising:
setting up a replication partnership between a first storage node and a second storage node, wherein setting up the replication partnership comprises:
establishing a secure connection between the first storage node and the second storage node using a remote internet protocol address, a base port number, and an identifying key pair;
creating a port forwarding configuration for communications over the secure connection using a set of pre-established port offsets, wherein the creating of the port forwarding configuration comprises:
adding each respective pre-established port offset of the set of pre-established port offsets to the base port number to derive a respective port number of a plurality of port numbers, wherein the plurality of port numbers correspond to a plurality of communication links that are part of the port forwarding configuration, and the plurality of communication links are between the first storage node and the second storage node;
and
exchanging encryption keys between the first storage node and the second storage node using the port forwarding configuration.

2. The method of claim 1, comprising using a first port, identified by a first port number of the plurality of port numbers of the port forwarding configuration, for the exchange of the encryption keys prior to allowing replication of an encrypted volume on the first port.

3. The method of claim 1, wherein a first pre-established port offset of the set of pre-established port offsets is assigned for a first type of communication over a first communication link of the plurality of communication links, and a second pre-established port offset of the set of pre-established port offsets is assigned for a second type of communication over a second communication link of the plurality of communication links.

4. The method of claim 1, further comprising configuring a proxy server that is associated with the second storage node to establish the secure connection for the replication partnership over a public network.

5. The method of claim 4, wherein the configuring of the proxy server comprises:
   storing in the proxy server credentials for authenticating the first storage node to use the secure connection;
   establishing port translations to be used in the secure connection in communicating replication data between the first storage node and the second storage node; and
   communicating replication partnership information to the second storage node.

6. The method of claim 4, wherein the configuring of the proxy server comprises:
   communicating a key associated with the first storage node to the proxy server.

7. The method of claim 4, wherein the configuring of the proxy server comprises communicating data to the proxy server representing a replication partnership identification associated with the first storage node and a replication partnership credential associated with the first storage node.

8. The method of claim 1, further comprising commencing replication between the first storage node and the second storage node for an encrypted volume.

9. The method of claim 1, wherein the creating of the port forwarding configuration comprises configuring local tunnel and reverse tunnel port translations associated with a public Internet Protocol (IP) address of the second storage node.

10. The method of claim 1, further comprising providing a portal accessible through a public network to receive data representing credentials of the first storage node.

11. An apparatus comprising:
   a processor; and
   a non-transitory storage medium storing instructions executable on the processor to:
      set up a replication partnership between a first storage node and a second storage node, wherein the instructions to set up the replication partnership comprise instructions executable on the processor to:
         establish a secure connection between the first storage node and the second storage node using a remote internet protocol address, a base port number, and an identifying key pair;
         create a port forwarding configuration for communications over the secure connection using a set of pre-established port offsets, wherein the creating of the port forwarding configuration comprises:
            adding each respective pre-established port offset of the set of pre-established port offsets to the base port number to derive a respective port number of a plurality of port numbers, wherein the plurality of port numbers correspond to a plurality of communication links that are part of the port forwarding configuration, and the plurality of communication links are between the first storage node and the second storage node; and
      exchange encryption keys between the first storage node and the second storage node using at least one communication link corresponding to at least one pre-established port offset of the set of pre-established port offsets.

12. The apparatus of claim 11, wherein the identifying key pair comprises Secure SHell (SSH) keys of the first storage node and the second storage node, and the encryption keys are to encrypt replicated data between the first storage node and the second storage node.

13. The apparatus of claim 11, wherein a first pre-established port offset of the set of pre-established port offsets is assigned for a first type of communication over a first communication link of the plurality of communication links, and a second pre-established port offset of the set of pre-established port offsets is assigned for a second type of communication over a second communication link of the plurality of communication links.

14. The apparatus of claim 11, wherein the instructions are executable on the processor to:
   configure a proxy server that is associated with the second storage node to establish the secure connection for the replication partnership over a public network.

15. The apparatus of claim 13, wherein the first type of communication over the first communication link comprises management communication between the first storage node and the second storage node, and the second type of communication over the second communication link comprises data transfer associated with data replication between the first storage node and the second storage node.

16. A non-transitory storage medium storing instructions that, when executed by a machine, cause the machine to:
   set up a replication partnership between a first storage node and a second storage node, wherein the instructions to set up the replication partnership comprise instructions to:
      establish a secure connection between the first storage node and the second storage node using a remote internet protocol address, a base port number, and an identifying key pair;
      create a port forwarding configuration using a set of pre-established port offsets, wherein the creating of the port forwarding configuration comprises:
         adding each respective pre-established port offset of the set of pre-established port offsets to the base port number to derive a respective port number of a plurality of port numbers, wherein the plurality of port numbers correspond to a plurality of communication links that are part of the port forwarding configuration, and the plurality of communication links over are between the first storage node and the second storage node; and
      exchange encryption keys between the first storage node and the second storage node using the port forwarding configuration.

17. The non-transitory storage medium of claim 16, wherein a first pre-established port offset of the set of pre-established port offsets is assigned for a first type of communication over a first communication link of the plurality of communication links, and a second pre-established port offset of the set of pre-established port offsets is assigned for a second type of communication over a second communication link of the plurality of communication links, wherein the second type of communication is different from the first type of communication.

18. The non-transitory storage medium of claim 16, wherein the instructions, when executed by the machine, cause the machine to negotiate additional port mappings from the first storage node to a third storage node.

19. The non-transitory storage medium of claim 16, wherein the instructions, when executed by the machine, cause the machine to configure a proxy server that is associated with the second storage node to establish the secure connection for the replication partnership over a public network.

20. The non-transitory storage medium of claim 16, wherein the instructions, when executed by the machine, cause the machine to:
provide a portal accessible through a public network to receive data representing a credential of the first storage node.

* * * * *